US012782966B2

(12) United States Patent
Okamoto

(10) Patent No.: US 12,782,966 B2
(45) Date of Patent: Nov. 3, 2026

(54) WORK MANAGEMENT METHOD, WORK MANAGEMENT PROGRAM, AND WORK MANAGEMENT SYSTEM

(71) Applicant: Yanmar Holdings Co., Ltd., Osaka (JP)

(72) Inventor: Naoto Okamoto, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 92 days.

(21) Appl. No.: 18/803,926

(22) Filed: Aug. 14, 2024

(65) Prior Publication Data

US 2025/0103059 A1 Mar. 27, 2025

(30) Foreign Application Priority Data

Sep. 25, 2023 (JP) ................................ 2023-160027

(51) Int. Cl.

*G05D 1/648* (2024.01)
*G01C 21/36* (2006.01)
*G07C 5/08* (2006.01)
*H04W 4/029* (2018.01)

(52) U.S. Cl.

CPC ......... *G05D 1/648* (2024.01); *G01C 21/3626* (2013.01); *G07C 5/0841* (2013.01); *H04W 4/029* (2018.02)

(58) Field of Classification Search

None

See application file for complete search history.

(56) References Cited

U.S. PATENT DOCUMENTS 10,201,121 B1 * 2/2019 Wilson ................. A01B 79/005
2014/0257911 A1 * 9/2014 Anderson ........ G06Q 10/06315 705/7.25
2020/0084955 A1 * 3/2020 Kreider ................ G05D 1/2246
2023/0030108 A1 2/2023 Danguchi
2023/0153709 A1 5/2023 Yamazaki et al.
2023/0279638 A1 9/2023 Danguchi
2024/0172577 A1 * 5/2024 Kubota .................. A01B 69/00

OTHER PUBLICATIONS

The extended European search report Application No./Patent No. 24212003.8-1002 Applicant/Proprietor: Yanmar Holdings Co., Ltd. Date: May 8, 2025.

* cited by examiner

*Primary Examiner* — Tamara L Weber

(74) *Attorney, Agent, or Firm* — Chris Mizumoto

(57) ABSTRACT

An acquisition processing unit acquires work history information on work performed by a work vehicle in each of a plurality of fields, and movement history information on movement performed by the work vehicle on one or more roads that connect the plurality of fields. An output processing unit outputs, based on the work history information and the movement history information, an estimated required time that is required for the work vehicle to perform work in the plurality of fields.

11 Claims, 10 Drawing Sheets

WORK MANAGEMENT METHOD, WORK MANAGEMENT PROGRAM, AND WORK MANAGEMENT SYSTEM

CROSS-REFERENCE

This application claims foreign priority of JP2023-160027 filed Sep. 25, 2023, the disclosures of which are hereby incorporated by reference in its entirety.

TECHNICAL FIELD

The present invention relates to a work management method, a work management program, and a work management system that manage work performed by a work vehicle.

BACKGROUND ART

In recent years, advancing automation technology for agricultural machinery introduces work vehicles that perform work while automatically traveling in a field. For example, such a work vehicle includes a positioning unit that acquires position information on the work vehicle using a positioning system, and automatically travels along a target route set in advance for a field. Conventionally, a system is known in which an estimated work time required for the work vehicle to perform work in a field is calculated and displayed on an operation terminal (user terminal) (see, for example, Patent Document 1).

PRIOR ART DOCUMENT

Patent Document

Patent Document 1: Japanese Patent No. 6807794

SUMMARY OF INVENTION

Technical Problem

In some cases, a work vehicle sequentially performs work in a plurality of fields. For example, after a work vehicle finishes work in a field, the work vehicle travels on a farm road or the like to move to a next field, and performs work in the field. In the case where a work vehicle sequentially performs work in a plurality of fields in this manner, it is difficult to determine, using the conventional technique, a time required for work to be performed in the plurality of fields.

An object of the present invention is to provide a work management method, a work management program, and a work management system capable of determining a time required for a work vehicle to perform work in a plurality of fields.

Solution to Problem

A work management method according to the present invention is a work management method including: acquiring work history information on work performed by a work vehicle in each of a plurality of work regions, and movement history information on movement performed in the work by the work vehicle on one or more connecting roads that connect the plurality of work regions; and outputting, based on the work history information and the movement history information, an estimated required time that is required for the work vehicle to perform work in the plurality of work regions.

A work management program according to the present invention is a work management program for causing one or more processors to acquire work history information on work performed by a work vehicle in each of a plurality of work regions, and movement history information on movement performed by the work vehicle on one or more connecting roads that connect the plurality of work regions, and to output, based on the work history information and the movement history information, an estimated required time that is required for the work vehicle to perform work in the plurality of work regions.

A work management system according to the present invention includes an acquisition processing unit and an output processing unit. The acquisition processing unit acquires work history information on work performed by a work vehicle in each of a plurality of work regions, and movement history information on movement performed by the work vehicle on one or more connecting roads that connect the plurality of work regions. The output processing unit outputs, based on the work history information and the movement history information, an estimated required time that is required for the work vehicle to perform work in the plurality of work regions.

Advantageous Effects of Invention

The present invention provides a work management method, a work management program, and a work management system capable of determining a time required for a work vehicle to perform work in a plurality of fields.

DESCRIPTION OF EMBODIMENTS

The following embodiment is an example embodying the present invention, and does not limit the technical scope of the present invention.

Figure 1:
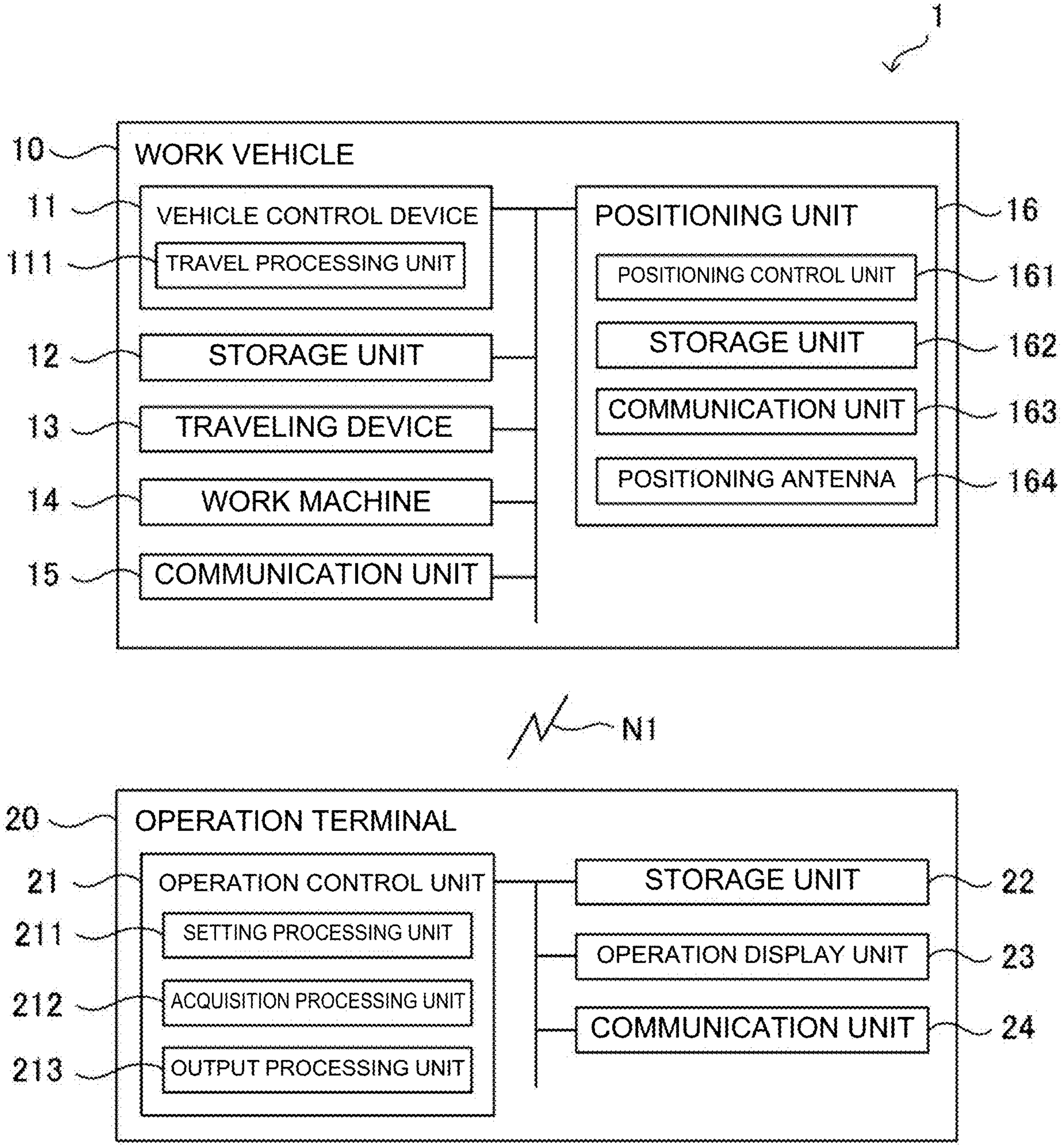
FIG. 1 is a block diagram illustrating a configuration of an automatic traveling system according to an embodiment of the present invention.

As illustrated in FIG. 1, an automatic traveling system 1 according to the embodiment of the present invention includes a work vehicle 10 and an operation terminal 20. The work vehicle 10 and the operation terminal 20 can communicate with each other through a communication network N1. For example, the work vehicle 10 and the operation terminal 20 can communicate with each other through a mobile phone network, a packet network, or a wireless LAN.

In the present embodiment, an example will be described in which the work vehicle 10 is a tractor. As another embodiment, the work vehicle 10 may be a rice transplanter, a combine harvester, a construction machine, a snowplow, or the like. The work vehicle 10 is configured to be able to automatically (autonomously) travel along a target route set in advance in a field that is a work region. The work vehicle 10 can perform predetermined work while automatically traveling along a target route in a field. Furthermore, the work vehicle 10 is configured to be able to automatically travel along a movement route set in advance on a road (connecting road) that connects a plurality of fields. The work vehicle 10 automatically travels along a target route and a movement route set in advance on a road inside and outside a field, based on position information on the current position of the work vehicle 10 that is calculated by a positioning unit 16.

Figure 3:
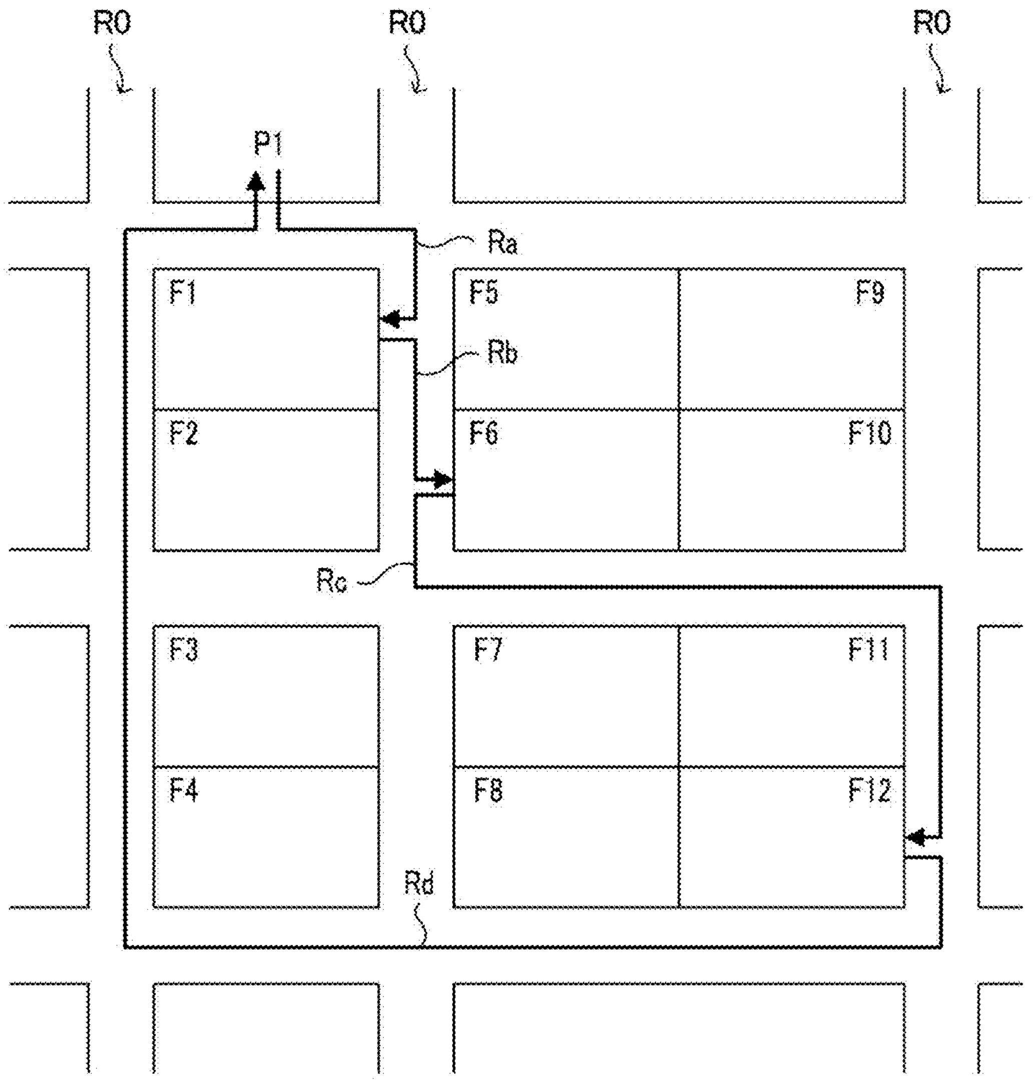
FIG. 3 is a diagram illustrating an example of a target route according to an embodiment of the present invention.
Figure 4:
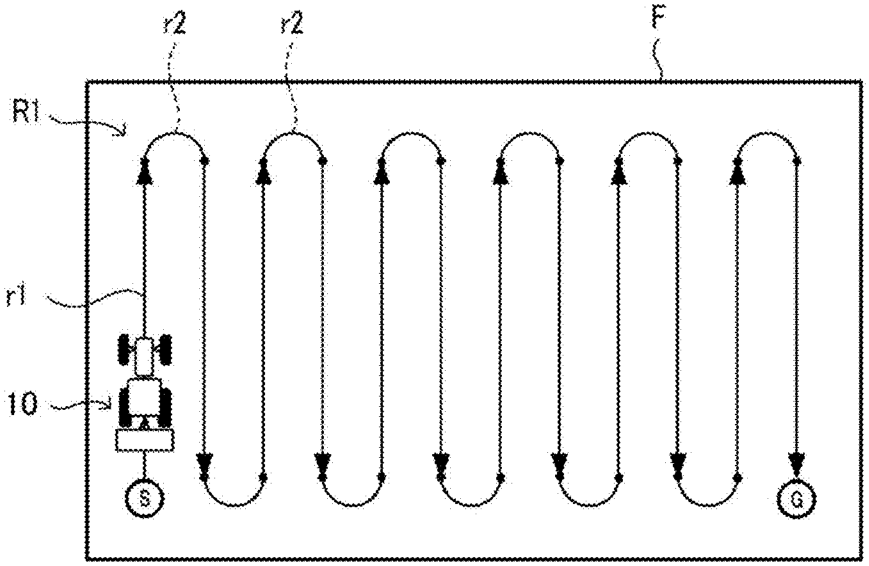
FIG. 4 is a diagram illustrating an example of a target route set for a field according to an embodiment of the present invention.

For example, as illustrated in FIG. 3, the work vehicle 10 starts automatic travel at a predetermined position P1 (travel start position), and automatically travels along a movement route Ra set in advance on a road R0 to move to a field F1, and in the field F1, the work vehicle 10 performs predetermined work while automatically traveling along a target route R1 (work route) set in advance (see FIG. 4). Subsequently, when the work in the field F1 is finished, the work vehicle 10 automatically travels along a movement route Rb set in advance on the road R0 to move to a field F6, and in the field F6, the work vehicle 10 performs predetermined work while automatically traveling along a target route R1 set in advance (see FIG. 4). Subsequently, when the work in the field F6 is finished, the work vehicle 10 automatically travels along a movement route Rc set in advance on the road R0 to move to a field F12, and in the field F12, the work vehicle 10 performs predetermined work while automatically traveling along a target route R1 set in advance (see FIG. 4). Subsequently, when the work in the field F12 is finished, the work vehicle 10 automatically travels along a movement route Rd set in advance on the road R0 to return to the predetermined position P1 (travel end position), and ends the automatic travel.

FIG. 4 illustrates an example of a target route R1 set in a field F (an example of the fields F1 to F12 illustrated in FIG. 3). For example, the target route R1 includes a plurality of parallel straight routes r1, and turning routes r2 each of which connects adjacent straight routes r1. The work vehicle 10 performs predetermined work while automatically traveling on the straight routes r1 and the turning routes r2 from a work start position S to a work end position G. A target route R1 is generated for each field F according to the content of work performed in the field F, or the like. Furthermore, a target route R1 is generated on the operation terminal 20 according to an operation performed by a user (worker, operator, or the like).

A movement route set for the road R0 is generated on the operation terminal 20 according to a user operation (teaching operation or the like). The road R0 (connecting road of the present invention) may be a work vehicle dedicated road such as a farm road, a forest road, a public road, a private road, or a motorway, or may be a road through which a general vehicle (passenger vehicle or the like) can pass.

In the case where the work vehicle 10 sequentially performs work in a plurality of fields F, it is difficult to determine, using the conventional technique, a time required for work. On the other hand, as described below, the automatic traveling system 1 according to the present embodiment can determine a time required for the work vehicle 10 to perform work in the plurality of fields F.

[Work Vehicle 10]

Figure 2:
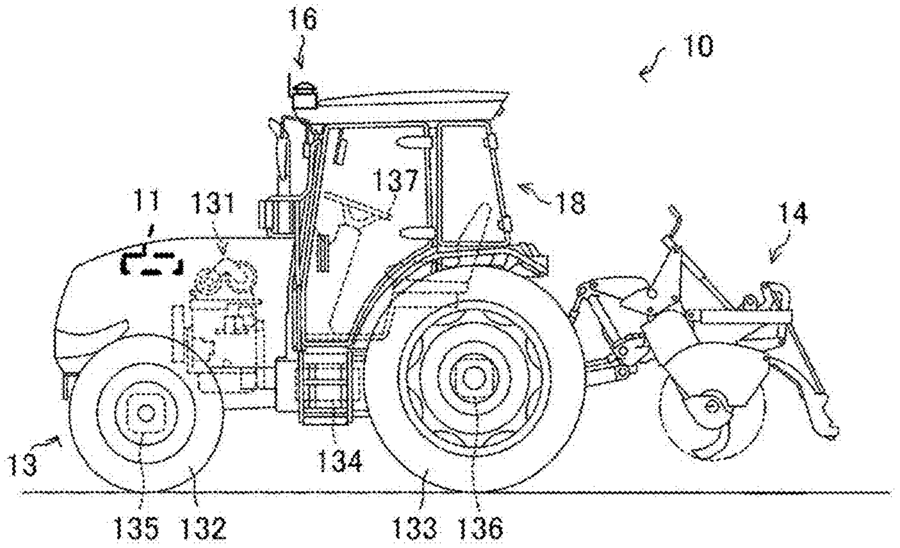
FIG. 2 is an external view of an example of a work vehicle according to an embodiment of the present invention.

As illustrated in FIGS. 1 and 2, the work vehicle 10 includes a vehicle control device 11, a storage unit 12, a traveling device 13, a work machine 14, a communication unit 15, the positioning unit 16, and the like. The vehicle control device 11 is electrically connected to the storage unit 12, the traveling device 13, the work machine 14, the positioning unit 16, and the like. The vehicle control device 11 and the positioning unit 16 may be able to perform wireless communication.

The communication unit 15 is a communication interface that connects the work vehicle 10 to the communication network N1 by wire or wirelessly and performs data communication according to a predetermined communication protocol with an external device such as the operation terminal 20 through the communication network N1. The work vehicle 10 can wirelessly communicate with the operation terminal 20 via the communication unit 15.

The storage unit 12 is a non-volatile storage unit such as a hard disk drive (HDD) or a solid state drive (SSD) that stores various types of information. The storage unit 12 stores a control program such as an automatic traveling program for causing the vehicle control device 11 to perform an automatic traveling process (see FIG. 12) described below. For example, the automatic traveling program is recorded in a non-transitory manner in a computer-readable recording medium such as a flash ROM, an EEPROM, a CD, or a DVD, and is read by a predetermined reading device (not illustrated) and stored in the storage unit 12. The automatic traveling program may be downloaded from a server (not illustrated) to the work vehicle 10 through the communication network N1 and stored in the storage unit 12. The storage unit 12 may store route data on a target route R1 and a movement route that are generated on the operation terminal 20.

The traveling device 13 is a drive unit that causes the work vehicle 10 to travel. As illustrated in FIG. 2, the traveling device 13 includes an engine 131, front wheels 132, rear wheels 133, a transmission 134, a front axle 135, a rear axle 136, a steering wheel 137, and the like. The front wheels 132 and the rear wheels 133 are provided on both the left and right of the work vehicle 10. Furthermore, the traveling device 13 is not limited to a wheel-type traveling device including the front wheels 132 and the rear wheels 133, and may be a crawler-type traveling device that includes crawlers provided on the left and right of the work vehicle 10.

The engine 131 is a drive source such as a diesel engine or a gasoline engine that is driven using fuel supplied to a fuel tank (not illustrated). The traveling device 13 may include an electric motor as a drive source, in addition to or instead of the engine 131. A generator (not illustrated) is connected to the engine 131, and electric power is supplied from the generator to electrical components such as the vehicle control device 11, a battery, and the like of the work vehicle 10. The battery is charged with electric power supplied from the generator. The electrical components such as the vehicle control device 11 and the positioning unit 16 of the work vehicle 10 can be driven by electric power supplied from the battery, even after the engine 131 is stopped.

The driving force of the engine 131 is transmitted to the front wheels 132 via the transmission 134 and the front axle 135, and is transmitted to the rear wheels 133 via the transmission 134 and the rear axle 136. The driving force of the engine 131 is also transmitted to the work machine 14 via a PTO shaft (not illustrated). When the work vehicle 10 performs automatic travel, the traveling device 13 performs a traveling action according to a command from the vehicle control device 11.

The work machine 14 is, for example, a cultivator, a mower, a plow, a fertilizer applicator, a seeder, a sprayer, or the like, and is attachable to and detachable from the work vehicle 10. Thus, the work vehicle 10 can perform various types of work using such work machines 14. In the present embodiment, an example will be described in which the work machine 14 is a cultivator and the work vehicle 10 performs cultivation work in a plurality of fields.

When the work vehicle 10 travels on the road R0 (see FIG. 3), the work vehicle 10 may travel while the work machine 14 is attached to the work vehicle 10 or while the work machine 14 is detached from the work vehicle 10. For example, in the case where the work vehicle 10 performs cultivation work in each of the field F1, the field F6, and the field F12, after the cultivation work in the field F1 is finished, the work vehicle 10 travels on the road R0 to move to the field F6 while the work machine 14 is attached to the work vehicle 10, and performs cultivation work in the field F6, and after the cultivation work in the field F6 is finished, the work vehicle 10 travels on the road R0 to move to the field F12 while the work machine 14 is attached to the work vehicle 10, and performs cultivation work in the field F12. In the case where the work vehicle 10 has a function of raising and lowering the work machine 14, the work vehicle 10 travels on the road R0 while the work machine 14 is raised.

Furthermore, for example, in the case where the work vehicle 10 performs different types of work in the respective field F1 and field F6, after the work in the field F1 is finished, the work vehicle 10 travels on the road R0 to move to the field F6 while the work machine 14 is detached from the work vehicle 10, and the work vehicle 10 performs work in the field F6 while another work machine 14 is attached to the work vehicle 10.

The steering wheel 137 is an operation unit that is operated by the worker or the vehicle control device 11. For example, in the traveling device 13, according to an operation of the steering wheel 137 performed by the vehicle control device 11, the angle of the front wheels 132 is changed by a hydraulic power steering mechanism (not illustrated) or the like to change the direction of travel of the work vehicle 10. When the worker performs a teaching operation, the worker operates the steering wheel 137 to cause the work vehicle 10 to perform manual travel.

In addition to the steering wheel 137, the traveling device 13 includes a shift lever, an accelerator, a brake, and the like (not illustrated) that are operated by the vehicle control device 11. In the traveling device 13, according to an operation of the shift lever performed by the vehicle control device 11, the gear of the transmission 134 is switched to a forward gear, a reverse gear, or the like to switch the travel mode of the work vehicle 10 to forward movement, backward movement, or the like. The vehicle control device 11 operates the accelerator to control the rotation speed of the engine 131. Furthermore, the vehicle control device 11 operates the brake to use an electromagnetic brake to slow or stop the rotation of the front wheels 132 and the rear wheels 133.

The positioning unit 16 is a communication device that includes a positioning control unit 161, a storage unit 162, a communication unit 163, a positioning antenna 164, and the like. For example, as illustrated in FIG. 2, the positioning unit 16 is provided in an upper portion of a cabin 18 in which the worker gets. The installation position of the positioning unit 16 is not limited to the cabin 18. Furthermore, the positioning control unit 161, the storage unit 162, the communication unit 163, and the positioning antenna 164 of the positioning unit 16 may be distributed at different positions in the work vehicle 10. As described above, the battery is connected to the positioning unit 16, and allows the positioning unit 16 to be operated while the engine 131 is stopped. Furthermore, the positioning unit 16 may be substituted, for example, with a mobile phone terminal, a smartphone, a tablet terminal, a quantum compass, or the like.

The positioning control unit 161 is a computer system that includes one or more processors, and storage memories such as a non-volatile memory and a RAM. The storage unit 162 is, for example, a non-volatile memory that stores a program for causing the positioning control unit 161 to perform a positioning process, and data such as positioning information and movement information. For example, the program is recorded in a non-transitory manner in a computer-readable recording medium such as a flash ROM, an EEPROM, a CD, or a DVD, and is read by a predetermined reading device (not illustrated) and stored in the storage unit 162. The program may be downloaded from a server (not illustrated) to the positioning unit 16 through the communication network N1 and stored in the storage unit 162.

The communication unit 163 is a communication interface that connects the positioning unit 16 to the communication network N1 by wire or wirelessly and performs data communication according to a predetermined communication protocol with an external device such as a base station (not illustrated) through the communication network N1.

The positioning antenna 164 is an antenna that receives a radio wave (GNSS signal) transmitted from a satellite.

The positioning control unit 161 calculates the current position of the work vehicle 10 based on a GNSS signal received from a satellite by the positioning antenna 164. For example, when the work vehicle 10 automatically travels in a field, on a road, or the like, and the positioning antenna 164 receives radio waves (transmission time, orbit information, and the like) transmitted from the respective plurality of satellites, the positioning control unit 161 calculates a distance between the positioning antenna 164 and each of the satellites, and calculates the current position (latitude and longitude) of the work vehicle 10 based on the calculated distance.

Furthermore, the positioning control unit 161 may perform positioning by a real-time kinematic method (RTK-GNSS positioning method (RTK method)) in which the current position of the work vehicle 10 is calculated using correction information corresponding to a base station (reference station) close to the work vehicle 10. Thus, the work vehicle 10 automatically travels using positioning information obtained by the RTK method. The current position of the work vehicle 10 may be the same as the positioning position (e.g., the position of the positioning antenna 164), or may be deviated from the positioning position. The positioning control unit 161 may use a quantum compass to perform calculation (positioning) of the current position of the work vehicle 10.

The vehicle control device 11 includes control devices such as a CPU, a ROM, and a RAM. The CPU is a processor that performs various types of arithmetic processing. The ROM is a non-volatile storage unit that stores in advance control programs such as a BIOS and an OS for causing the CPU to perform various types of arithmetic processing. The RAM is a volatile or non-volatile storage unit that stores various types of information, and is used as a temporary storage memory (workspace) for various types of processing performed by the CPU. The vehicle control device 11 causes the CPU to execute various control programs stored in advance in the ROM or the storage unit 12 to control the work vehicle 10.

The vehicle control device 11 controls the action of the work vehicle 10 according to various user operations with respect to the work vehicle 10. Furthermore, the vehicle control device 11 performs an automatic traveling process of the work vehicle 10 based on the current position of the work vehicle 10 calculated by the positioning unit 16 and a target route R1 and a movement route set in advance.

As illustrated in FIG. 1, the vehicle control device 11 includes various processing units such as a travel processing unit 111. The vehicle control device 11 causes the CPU to perform various types of processing according to the automatic traveling program to function as the various processing units. Furthermore, some or all of the processing units may be composed of electronic circuits. The automatic traveling program may be a program for causing a plurality of processors to function as the processing units.

The travel processing unit 111 controls travel of the work vehicle 10. Specifically, when a travel start instruction is acquired from the operation terminal 20, the travel processing unit 111 causes the work vehicle 10 to start automatic travel.

For example, when the worker presses a start button (see FIG. 8B) on an operation screen of the operation terminal 20, the operation terminal 20 outputs a travel start instruction to the work vehicle 10. When a travel start instruction is acquired from the operation terminal 20, the travel processing unit 111 causes the work vehicle 10 to start automatic travel. Thus, for example, the work vehicle 10 starts automatic travel from the predetermined position P1, and automatically travels along the movement route Ra on the road R0 to move to the field F1, and in the field F1, the work vehicle 10 performs predetermined work while automatically traveling along the target route R1. Then, the work vehicle 10 automatically travels along the movement route Rb on the road R0 to move to the field F6, and in the field F6, the work vehicle 10 performs predetermined work while automatically traveling along the target route R1. Then, the work vehicle 10 automatically travels along the movement route Rc on the road R0 to move to the field F12, and in the field F12, the work vehicle 10 performs predetermined work while automatically traveling along the target route R1. Then, the work vehicle 10 automatically travels to the predetermined position P1 along the movement route Rd on the road R0.

The travel processing unit 111 may receive a work start instruction from the worker for each field, and perform automatic travel and work in the field.

The travel processing unit 111 acquires, from the operation terminal 20, route data corresponding to a target route R1 and a movement route for each field, and causes the work vehicle 10 to automatically travel along the target route R1 and the movement route.

When a travel stop instruction is acquired from the operation terminal 20, the travel processing unit 111 causes the work vehicle 10 to stop automatic travel. For example, when the worker presses a stop button on the operation screen of the operation terminal 20, the operation terminal 20 outputs a travel stop instruction to the work vehicle 10.

Furthermore, when the work vehicle 10 detects an obstacle, the travel processing unit 111 causes the work vehicle 10 to stop automatic travel. For example, when an obstacle detection device (not illustrated) mounted on the work vehicle 10 detects an obstacle in the range of 3 m to 8 m in front of the work vehicle 10, the travel processing unit 111 causes the work vehicle 10 to decelerate. Furthermore, when the obstacle detection device detects an obstacle in the range up to 3 m in front of the work vehicle 10, the travel processing unit 111 causes the work vehicle 10 to stop.

[Operation Terminal 20]

As illustrated in FIG. 1, the operation terminal 20 is an information processing device that includes an operation control unit 21, a storage unit 22, an operation display unit 23, a communication unit 24, and the like. The operation terminal 20 may be composed of a mobile terminal such as a tablet terminal or a smartphone.

The communication unit 24 is a communication interface that connects the operation terminal 20 to the communication network N1 by wire or wirelessly and performs data communication according to a predetermined communication protocol with an external device such as one or more work vehicles 10 through the communication network N1.

The operation display unit 23 is a user interface that includes a display unit such as a liquid crystal display or an organic EL display that displays various types of information, and an operation unit such as a touch panel, a mouse, or a keyboard that receives an operation. The worker can perform an operation of registering various types of information (work vehicle information, field information, work information, and the like described below) by operating the operation unit on the operation screen displayed on the display unit.

The worker performs, using the operation unit, an operation (teaching operation) of setting a movement route for causing the work vehicle 10 to automatically travel on a road R0 (connecting road) that connects fields.

The worker can issue a travel start instruction, a travel stop instruction, and the like to the work vehicle 10 by operating the operation unit. Furthermore, in a location away from the work vehicle 10, the worker can determine, based on a travel path displayed on the operation terminal 20, a progress status such as a travel status and a work status of the work vehicle 10 that automatically travels along a target route R1 and a movement route in a field and on a road.

The storage unit 22 is a non-volatile storage unit such as an HDD or an SSD that stores various types of information. The storage unit 22 stores a control program such as an automatic traveling program for causing the operation control unit 21 to perform the automatic traveling process (see FIG. 12) described below. For example, the automatic traveling program is recorded in a non-transitory manner in a computer-readable recording medium such as a flash ROM, an EEPROM, a CD, or a DVD, and is read by a predetermined reading device (not illustrated) and stored in the storage unit 22. The automatic traveling program may be downloaded from a server (not illustrated) to the operation terminal 20 through the communication network N1 and stored in the storage unit 22.

In the storage unit 22, a dedicated application for causing the work vehicle 10 to perform automatic travel is installed. The operation control unit 21 starts the dedicated application, for example, to perform a process of setting various types of information on the work vehicle 10, perform a process of generating a target route R1 and a movement route of the work vehicle 10, and issue an automatic travel instruction to the work vehicle 10.

Furthermore, the storage unit 22 stores data such as work vehicle information that is information on the work vehicle 10, and target route information that is information on a target route.

The work vehicle information includes information such as a vehicle number and a model for each work vehicle 10.

The vehicle number is identification information of the work vehicle 10. The model is a model of the work vehicle 10.

The work vehicle information stored in the storage unit 22 may be work vehicle information on a single work vehicle 10, or may be work vehicle information on a plurality of work vehicles 10. For example, in the case where a particular worker owns a plurality of work vehicles 10, work vehicle information on each of the work vehicles 10 is stored in the storage unit 22.

The target route information includes information such as a route name, a field name, an address, a field area, and a work time for each target route. The route name is a route name of a target route generated on the operation terminal 20. The field name is a name of a field in which work is to be performed and for which the target route is set. The address is an address of the field, and the field area is an area of the field. The work time is an estimated time (estimated required time or the like) that is required for the work vehicle 10 to perform work in the field.

In the case where the target route is a route (movement route) corresponding to the road R0, the target route information includes information such as a route name, an address, a travel distance, and a movement time. The route name is a name of the road, and the address is an address of the road. The travel distance is a distance that the work vehicle 10 travels on the road R0, and is, for example, a distance that the work vehicle 10 travels on the road R0 from the field F1 to the field F6.

The movement time is a time during which the work vehicle 10 travels on the road R0, and is, for example, an estimated time (estimated movement time) that is required for the work vehicle 10 to move from the field F1 to the field F6.

The target route information stored in the storage unit 22 may be target route information on a single target route, or may be target route information on a plurality of target routes. For example, in the case where a particular worker generates a plurality of target routes for one or more fields owned by the worker, target route information on each of the target routes is stored in the storage unit 22. For a single field, a single target route may be set, or a plurality of target routes may be set. Furthermore, for a single set of fields (two fields in which work is sequentially performed), a single movement route may be set, or a plurality of movement routes may be set. In the present embodiment, the storage unit 22 stores target route information corresponding to the target routes R1 (see FIG. 4) along which the work vehicle 10 travels in the fields F1, F6, and F12, and target route information corresponding to the movement routes Ra, Rb, Rc, and Rd (see FIG. 3) along which the work vehicle 10 travels on the road R0.

As another embodiment, part or all of the information such as the work vehicle information and the target route information may be stored in a server that is accessible from the operation terminal 20. The worker may perform an operation of registering the work vehicle information and the target route information in the server (e.g., a personal computer, a cloud server, or the like). In such a case, the operation control unit 21 may acquire the information from the server, and perform a process such as the automatic traveling process (see FIG. 12) described below.

The operation control unit 21 includes control devices such as a CPU, a ROM, and a RAM. The CPU is a processor that performs various types of arithmetic processing. The ROM is a non-volatile storage unit that stores in advance control programs such as a BIOS and an OS for causing the CPU to perform various types of arithmetic processing. The RAM is a volatile or non-volatile storage unit that stores various types of information, and is used as a temporary storage memory for various types of processing performed by the CPU. The operation control unit 21 causes the CPU to execute various control programs stored in advance in the ROM or the storage unit 22 to control the operation terminal 20.

As illustrated in FIG. 1, the operation control unit 21 includes various processing units such as a setting processing unit 211, an acquisition processing unit 212, and an output processing unit 213. The operation control unit 21 causes the CPU to perform various types of processing according to the control programs to function as the various processing units. Furthermore, some or all of the processing units may be composed of electronic circuits. The control programs may be programs for causing a plurality of processors to function as the processing units.

The setting processing unit 211 sets various types of setting information for causing the work vehicle 10 to perform automatic travel. Specifically, the setting processing unit 211 sets information on the work vehicle 10 (hereinafter referred to as work vehicle information). When the worker performs, on the operation terminal 20, an operation of registering information, the setting processing unit 211 sets the information. The information includes a type (model) of the work vehicle 10, a portion of the work vehicle 10 to which the positioning antenna 164 is attached, a type of the work machine 14, a size and shape of the work machine 14, a position of the work machine 14 with respect to the work vehicle 10, a vehicle speed and an engine rotation speed of the work vehicle 10 during work, and a vehicle speed and an engine rotation speed of the work vehicle 10 during turning.

Figure 5:
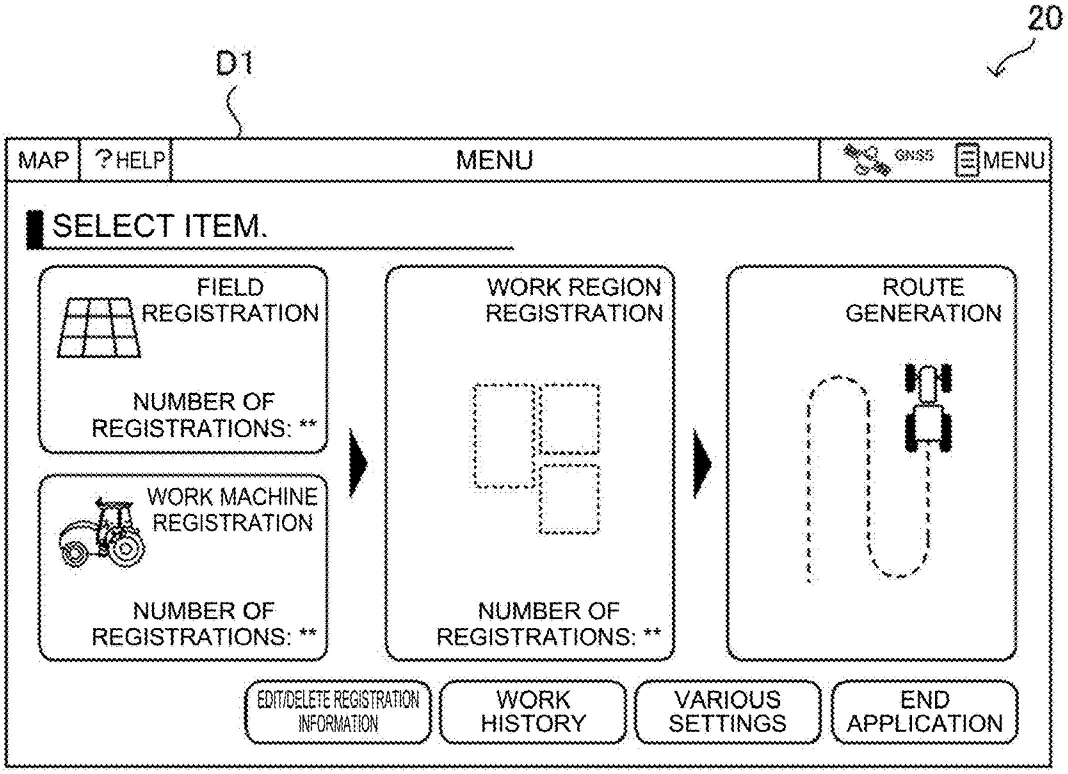
FIG. 5 is a diagram illustrating an example of a menu screen displayed on an operation terminal according to an embodiment of the present invention.

For example, the setting processing unit 211 displays a menu screen D1 illustrated in FIG. 5 on the operation display unit 23. The worker selects "work machine registration" on the menu screen D1 to register work machine information on the work machine 14.

Furthermore, the setting processing unit 211 sets information on a field (hereinafter referred to as field information). When the worker performs, on the operation terminal 20, an operation of registering information such as a position and a shape of a field, a work start position S at which work is started and a work end position G at which work is finished (see FIG. 4), and a work direction, the setting processing unit 211 sets the information. The work direction refers to a direction in which the work vehicle 10 travels while performing work using the work machine 14 in a work region that is a portion of a field other than a headland and a non-work region. For example, the worker selects "field registration" on the menu screen D1 to register field information.

Information on the position and shape of a field can be automatically acquired, for example, when the worker gets in and drives the work vehicle 10 around the entire outer periphery of the field, and records a change in position information of the positioning antenna 164 during driving. Furthermore, the position and shape of a field can also be acquired based on a polygon obtained when the worker specifies, by operating the operation terminal 20, a plurality of points on a map displayed on the operation terminal 20. The region specified based on the acquired position and shape of the field is a region (travel region) in which the work vehicle 10 can travel.

Furthermore, the setting processing unit 211 sets information on how to specifically perform work (hereinafter referred to as work information). The setting processing unit 211 is configured to be able to set, as work information, the presence or absence of cooperative work between an unattended work vehicle 10 and an attended work vehicle 10, the number of skips that is the number of work routes to be skipped in the case where the work vehicle 10 turns in a headland, the width of the headland, the width of non-cultivated land, and the like. For example, the worker selects "route generation" on the menu screen D1 to register work information.

Furthermore, the setting processing unit 211 generates, based on the setting information, a target route (a target route in a field, a movement route on a road) that is a route along which the work vehicle 10 automatically travels. The setting processing unit 211 generates a target route of the work vehicle 10 based on the setting information set in advance, and stores the target route. For example, the worker selects "route generation" on the menu screen D1, and issues an instruction to generate a target route.

The setting processing unit 211 sets a work plan in a route generation process. For example, to cause the work vehicle 10 to sequentially perform work in a plurality of fields, the setting processing unit 211 creates, based on a setting operation performed by the worker, a work plan that includes information such as a work order (movement order) of the plurality of fields, a time required for work, and a moving distance, and displays the work plan. The worker checks the created work plan, and starts work.

Figure 6:
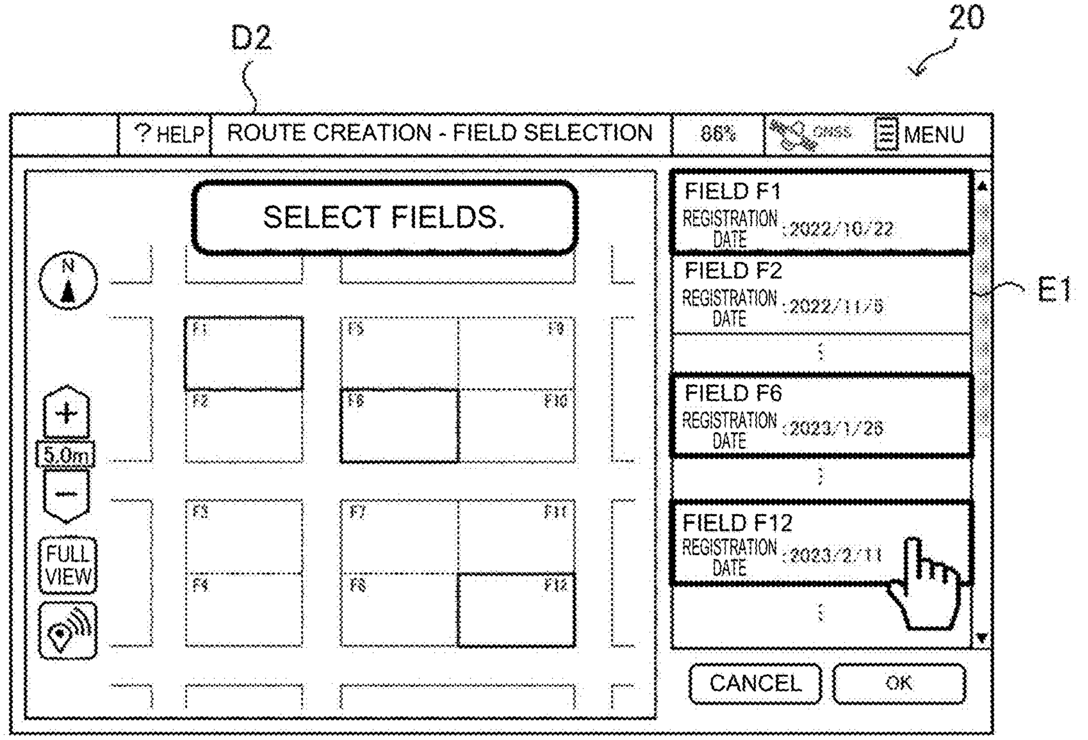
FIG. 6 is a diagram illustrating an example of a field selection screen displayed on the operation terminal according to an embodiment of the present invention.

Specifically, when the worker selects "route generation" on the menu screen D1, the setting processing unit 211 displays a field selection screen D2 illustrated in FIG. 6. On the field selection screen D2, map information including a plurality of fields, and a list (field list E1) of information on the plurality of fields registered in "field registration" are displayed. The field information in the field list E1 may include a field name, an address, a field area, a registration date, and the like. The setting processing unit 211 receives an operation of selecting a field from the worker on the field selection screen D2. For example, to cause the work vehicle 10 to sequentially perform work (e.g., cultivation work) in the field F1, the field F6, and the field F12 in this order, the worker selects the field F1, the field F6, and the field F12 in this order in the field list E1. Thus, the worker selects a plurality of fields in a work order. After selection of a plurality of fields, the worker may be able to set or change a work order of the plurality of fields.

As illustrated in FIG. 6, the setting processing unit 211 may display a field selected by the worker in a distinguishable manner (e.g., the selected field may be surrounded with a thick line, filled with a color, lit, blinking, or the like) in each of the field list E1 and the map information.

Figure 7:
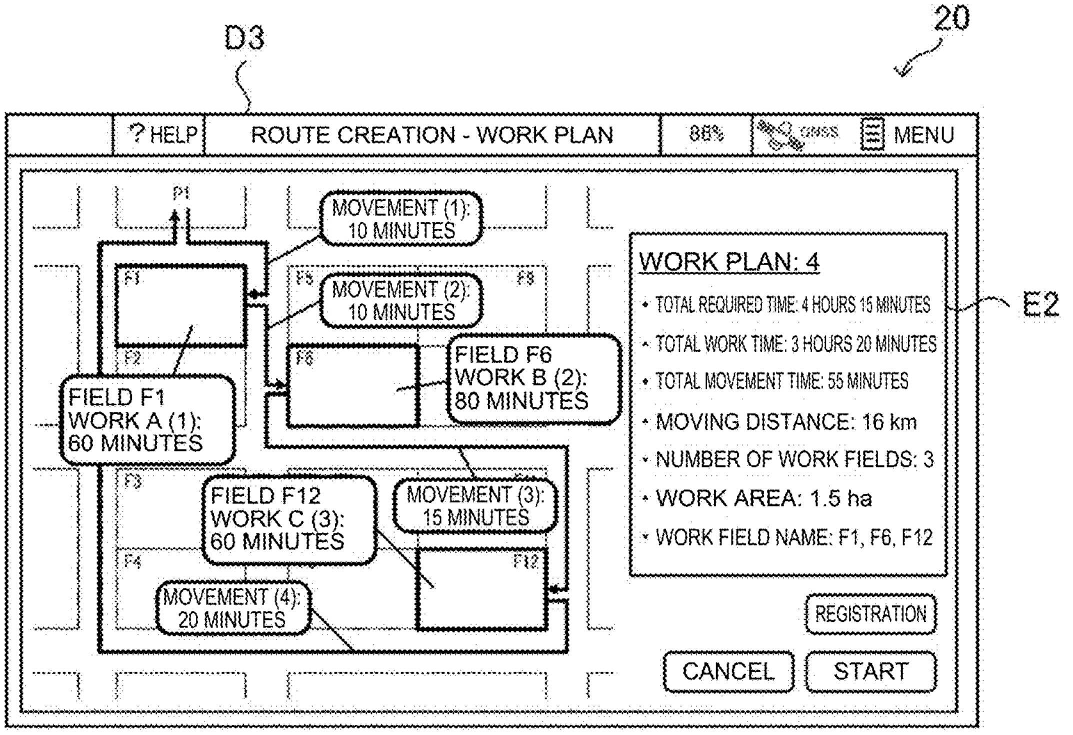
FIG. 7 is a diagram illustrating an example of a work plan screen displayed on the operation terminal according to an embodiment of the present invention.

When the worker selects a plurality of fields and presses an OK button on the field selection screen D2, the setting processing unit 211 displays a work plan screen D3 illustrated in FIG. 7. On the work plan screen D3, a movement route that connects the selected fields is displayed in the map information. Specifically, the setting processing unit 211 generates one or more movement routes that connect the plurality of fields (see FIG. 3) according to a work order of the selected plurality of fields, and displays the generated movement routes on the map. The setting processing unit 211 calculates, for each movement route, an estimated movement time that is required for the work vehicle 10 to move along the movement route, and displays the calculated estimated movement time in association with the movement route on the map. As illustrated in FIG. 7, the setting processing unit 211 displays a movement order of the movement routes in a distinguishable manner.

Furthermore, the setting processing unit 211 generates a target route R1 (see FIG. 3) for each selected field. In this case, the setting processing unit 211 generates a target route R1 for each of the fields F1, F6, and F12 based on the setting information set in advance. Although omitted from the drawings, the setting processing unit 211 displays the target route R1 generated for each field on the operation terminal 20. Furthermore, when the worker selects a field in the map on the work plan screen D3 illustrated in FIG. 7, the setting processing unit 211 may display a target route R1 corresponding to the selected field.

Furthermore, the setting processing unit 211 calculates, for each selected field, an estimated work time that is required for the work vehicle 10 to perform work, and displays the calculated estimated work time in association with the field on the map. As illustrated in FIG. 7, the setting processing unit 211 displays a work order of the fields in a distinguishable manner. The example illustrated in FIG. 7 shows that an estimated work time of work A in the field F1 that is performed first is 60 minutes, an estimated work time of work B in the field F6 that is performed next is 80 minutes, and an estimated work time of work C in the field F12 that is performed last is 60 minutes. In the present embodiment, the work A, work B, and work C are, for example, cultivation work. The work A, B, and C may be different types of work.

Thus, the setting processing unit 211 displays, on the map, a work plan for a series of work in which the work vehicle 10 starts traveling from the predetermined position P1, sequentially performs work in the fields F1, F6, and F12, and returns to the predetermined position P1. The predetermined position P1 is an example of a travel start position and a travel end position in the work plan. The setting processing unit 211 calculates the estimated movement time and the estimated work time based on previous work information (history information).

Specifically, the acquisition processing unit 212 acquires work history information on work performed by the work vehicle 10 in each of a plurality of fields, and movement history information on movement performed by the work vehicle 10 between the fields (on the road R0). The work history information and the movement history information are stored in the storage unit 22 each time the work vehicle 10 performs work. The storage unit 22 stores work time (work performance time) for each field. In the storage unit 22, a plurality of previous work times are accumulated for the same field. Similarly, the storage unit 22 stores a movement time (movement performance time) for each movement route set for the road R0. In the storage unit 22, a plurality of previous movement times are accumulated for the same movement route. Furthermore, each work time is stored in association with a work content. The acquisition processing unit 212 acquires, from the storage unit 22, the work history information associated with the plurality of fields selected by the worker, and the movement history information associated with the road R0 (movement route) that connects the fields.

The setting processing unit 211 calculates, for example, the average time of a plurality of previous work times in a field, and sets the average time as an estimated work time for the field. For example, the setting processing unit 211 calculates, for the field F1, the average time of a plurality of work times (work times of the work A in this case) included in a plurality of previous work performances, and sets the average time as an estimated work time ("60 minutes") for the field F1. Furthermore, for example, the setting processing unit 211 calculates, for the movement route Rb (see FIG. 3) that connects the field F1 and the field F6, the average time of a plurality of movement times included in a plurality of previous movement performances, and sets the average time as an estimated movement time ("10 minutes") for the movement route Rb.

Thus, the setting processing unit 211 calculates an estimated work time for each field and an estimated movement time for each movement route based on the work history information and the movement history information, and outputs (displays) the estimated work time and the estimated movement time.

Furthermore, based on the work history information and the movement history information, the setting processing unit 211 outputs an estimated required time (total required time) that is required for the work vehicle 10 to perform work in the plurality of fields. Specifically, the setting processing unit 211 displays an overall estimated required time (total required time) corresponding to the work plan. In the example illustrated in FIG. 7, the setting processing unit 211 displays, in a work plan display column E2, a total required time ("4 hours 15 minutes") obtained by calculating the sum of estimated work times for the respective fields F1, F6, and F12 and estimated movement times for the respective movement routes Ra, Rb, Rc, and Rd.

Furthermore, the setting processing unit 211 displays a total work time (estimated total work time) that is required for the work vehicle 10 to perform work in the plurality of fields, and a total movement time (estimated total movement time) that is required for the work vehicle 10 to move on the roads (movement routes). In the example illustrated in FIG. 7, the setting processing unit 211 displays, in the work plan display column E2, a total work time ("3 hours 20 minutes") obtained by calculating the sum of the estimated work times for the respective fields F1, F6, and F12, and a total movement time ("55 minutes") obtained by calculating the sum of the estimated movement times for the respective movement routes Ra, Rb, Rc, and Rd. The estimated required time (total required time) includes the total work time (estimated total work time) and the total movement time (estimated total movement time).

In addition, the setting processing unit 211 may display, in the work plan display column E2, a moving distance (the entire moving distance or a moving distance along the movement routes), the number of fields in which work is to be performed, a total work area, a name of the fields in which work is to be performed, and the like.

When the worker checks the work plan and presses a registration button on the work plan screen D3, the setting processing unit 211 provides identification information (number or the like, for example, as in "work plan 4") to the generated work plan, and registers the work plan in the storage unit 22. The work plan includes information such as the total required time, the total work time, the total movement time, the estimated work time for each field, the estimated movement time for each movement route, the target route R1 for each field, and the movement routes (see FIG. 7). Thus, when an operation of selecting a plurality of fields is received from the worker, the setting processing unit 211 creates a work plan that includes the estimated work time for each field and the estimated movement time for each movement route, and displays the work plan on the operation terminal 20.

Figure 8A:
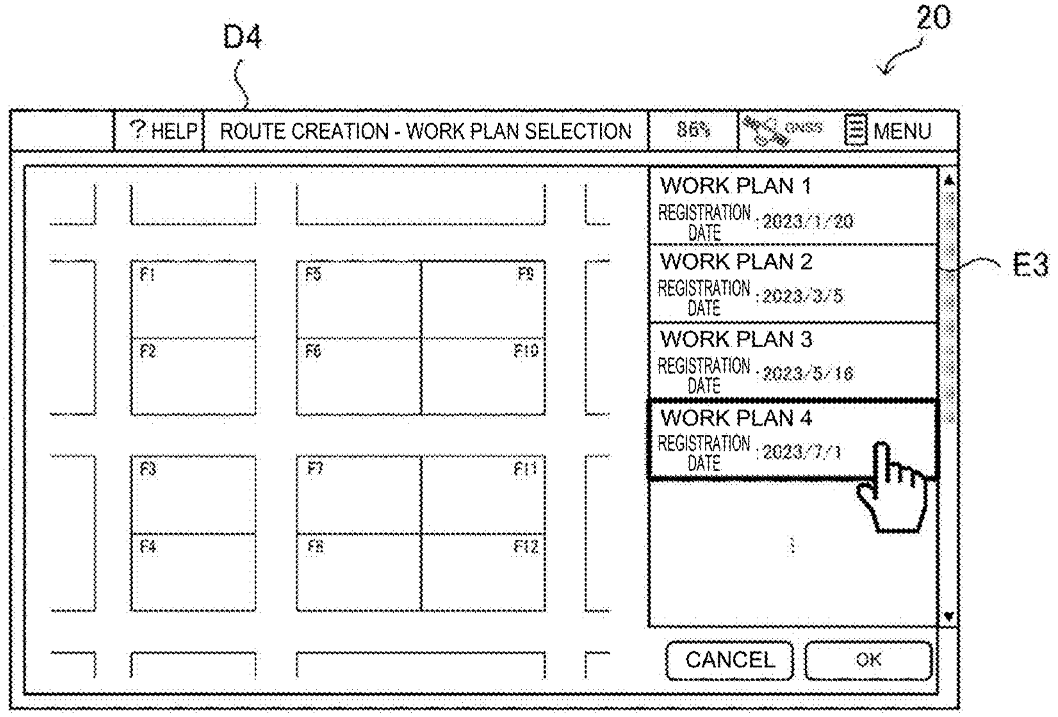
FIG. 8A is a diagram illustrating an example of a work plan selection screen displayed on the operation terminal according to an embodiment of the present invention.
Figure 8B:
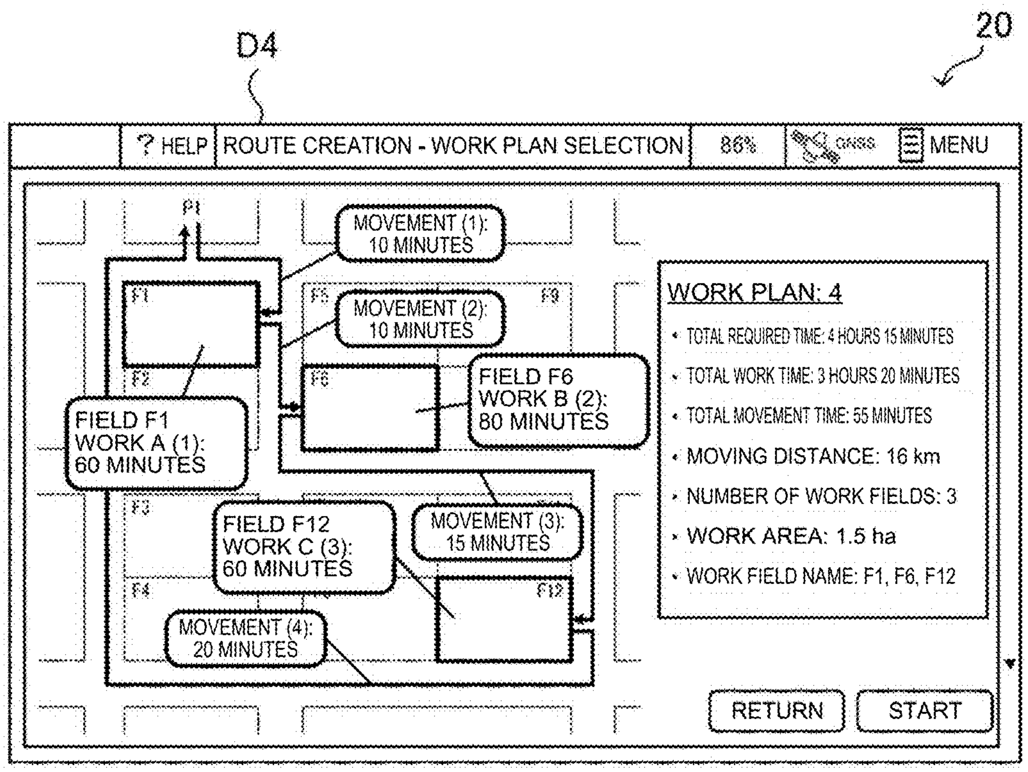
FIG. 8B is a diagram illustrating an example of the work plan selection screen displayed on the operation terminal according to an embodiment of the present invention.

The setting processing unit 211 displays, on a work plan selection screen D4 illustrated in FIG. 8A, a work plan list E3 in which registered work plans are listed. Each work plan in the work plan list E3 includes a name, a registration date, and the like of the work plan. The setting processing unit 211 receives an operation of selecting a work plan from the worker on the work plan selection screen D4. For example, when the worker selects "work plan 4" on the work plan selection screen D4, as illustrated in FIG. 8B, the setting processing unit 211 displays detailed information on the work plan 4 on the work plan selection screen D4.

To start work according to "work plan 4", the worker presses a start button on the work plan selection screen D4. When the worker presses the start button, the output processing unit 213 outputs, to the work vehicle 10, route data on the target routes and the movement routes corresponding to the work plan 4. In this case, the output processing unit 213 outputs, to the work vehicle 10, route data that includes the target routes R1 corresponding to the respective fields F1, F6, and F12, the movement route Ra that connects the predetermined position P1 and the field F1, the movement route Rb that connects the field F1 and the field F6, the movement route Rc that connects the field F6 and the field F12, and the movement route Rd that connects the field F12 and the predetermined position P1.

The work vehicle 10 is configured such that route data on a target route and a movement route generated on the operation terminal 20 is transferred to the work vehicle 10 and stored in the storage unit 12 and configured to be able to autonomously travel along the target route and the movement route while the current position of the work vehicle 10 is detected using the positioning antenna 164. The current position of the work vehicle 10 usually coincides with the position of the positioning antenna 164.

Furthermore, the work vehicle 10 is configured to be able to automatically travel in a field in the case where, when work is started in the field, a distance from the work start position S (see FIG. 3) in the field to the current position of the work vehicle 10 is less than a predetermined distance.

For example, in the case where the distance from the work start position S to the current position of the work vehicle 10 in the field is less than a predetermined distance, the travel processing unit 111 of the work vehicle 10 causes the work vehicle 10 to start automatic travel along the target route R1.

For example, the travel processing unit 111 causes the work vehicle 10 to automatically travel from the predetermined position P1 to the field F1 along the movement route Ra. When the work vehicle 10 reaches the field F1, in the field F1, the travel processing unit 111 causes the work vehicle 10 to automatically travel from the work start position S to the work end position G along the target route R1. When the work vehicle 10 reaches the work end position G, the travel processing unit 111 causes the work vehicle 10 to automatically travel from the field F1 to the field F6 along the movement route Rb. Similarly, in the field F6, the travel processing unit 111 causes the work vehicle 10 to automatically travel from the work start position S to the work end position G along the target route R1, and when the work vehicle 10 reaches the work end position G, the travel processing unit 111 causes the work vehicle 10 to automatically travel from the field F6 to the field F12 along the movement route Rc. Furthermore, in the field F12, the travel processing unit 111 causes the work vehicle 10 to automatically travel from the work start position S to the work end position G along the target route R1, and when the work vehicle 10 reaches the work end position G, the travel processing unit 111 causes the work vehicle 10 to automatically travel from the field F12 to the predetermined position P1 along the movement route Rd.

Figure 9:
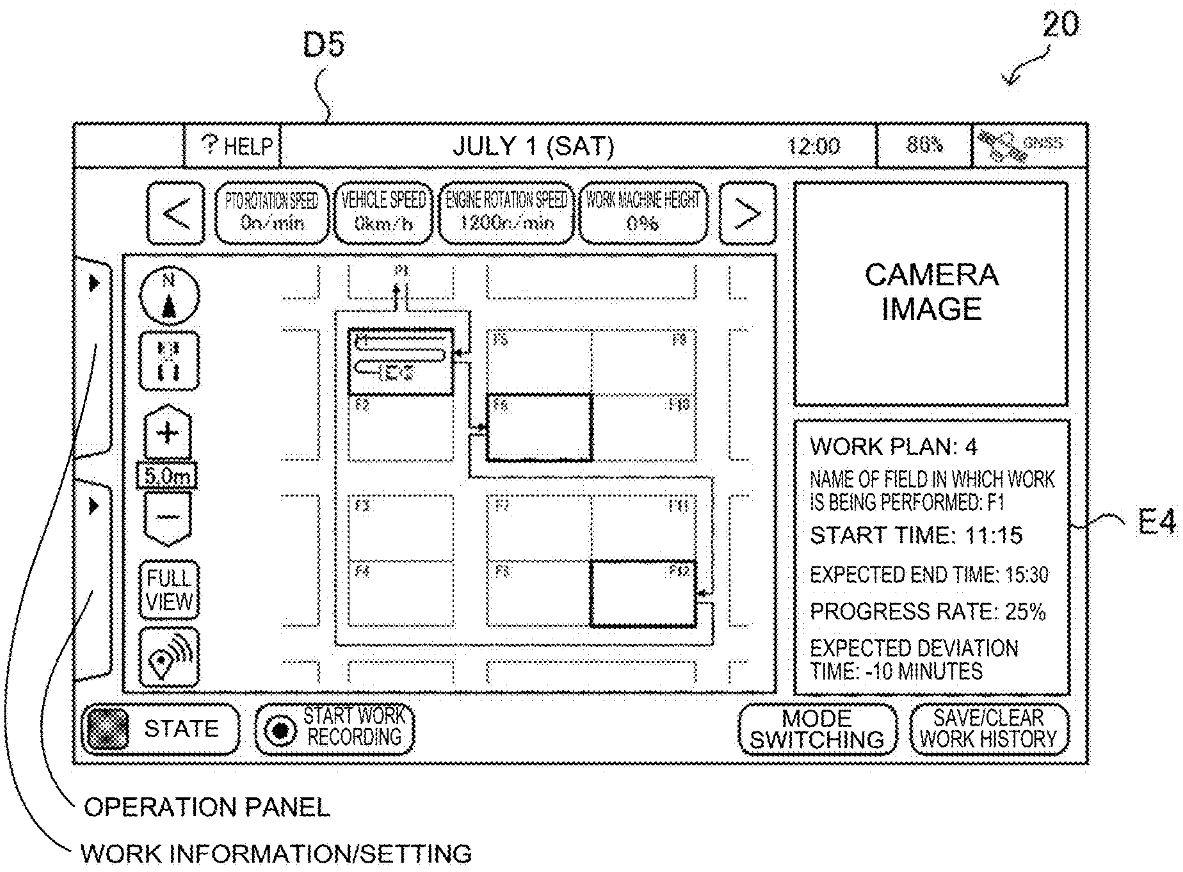
FIG. 9 is a diagram illustrating an example of a work screen displayed on the operation terminal according to an embodiment of the present invention.

When the work vehicle 10 starts automatic travel, the operation control unit 21 displays a travel status, a work progress status, and the like on the operation display unit 23 of the operation terminal 20. For example, when the work vehicle 10 starts automatic travel, the operation control unit 21 displays a work screen D5 illustrated in FIG. 9, and displays map information and work information E4 on the work screen D5. The operation control unit 21 displays a travel status such as a travel path and the current position of the work vehicle 10 on the map. Furthermore, the operation control unit 21 displays, in the work information E4, information such as identification information of the work plan ("work plan 4" in this case), a name of the field in which work is currently being performed, a time (start time) at which work is started, a time (expected end time) at which work is expected to be finished, a progress rate, and an expected deviation time. The expected end time is calculated from the total required time (see FIG. 8B) included in the work plan 4, and is, for example, obtained by adding the total required time to the start time. The progress rate is calculated based on information such as an elapsed time from the start time, the expected end time, the current position of the work vehicle 10, a total work area, an area of a worked region, and an area of an unworked region. The expected deviation time indicates a difference between the expected end time and a time at which work is expected to be actually finished, and is calculated, for example, based on the expected end time and the progress rate. The example illustrated in FIG. 9 shows that work is currently delayed by 10 minutes and that if the current pace of work continues, the work will be finished at "15:40" with a delay of 10 minutes from the expected end time ("15:30").

Thus, when work is performed according to the work plan by the work vehicle 10, the operation control unit 21 outputs (displays) progress information (the progress rate, the expected deviation time, and the like) that indicates a progress status with respect to the total required time. Furthermore, the operation control unit 21 updates the progress rate and the expected deviation time in real time according to the travel status and the work status of the work vehicle 10. Thus, while the work vehicle 10 is preforming work, the worker can determine the progress rate and the expected deviation time in real time on the operation terminal 20.

When a delay of a predetermined time from the expected end time occurs, that is, when the expected deviation time exceeds a predetermined time, the operation control unit 21 may provide notification of warning information. That is, when a work delay time from the work plan exceeds a predetermined time, the operation control unit 21 provides notification of predetermined information. For example, the operation control unit 21 may output (emit) a warning sound from the operation terminal 20, or may output a warning sound from the work vehicle 10.

As another embodiment, when the expected deviation time exceeds a predetermined time, the travel processing unit 111 of the work vehicle 10 may change the travel state of the work vehicle 10. For example, the travel processing unit 111 may increase the travel speed of the work vehicle 10 in an unworked region (e.g., a headland region in a field, a road that connects fields, or the like), or change the movement route. That is, the travel processing unit 111 may control travel of the work vehicle 10 based on the progress status. The process of changing the travel state is preferably permitted on condition that an instruction is issued by the worker.

Figure 10:
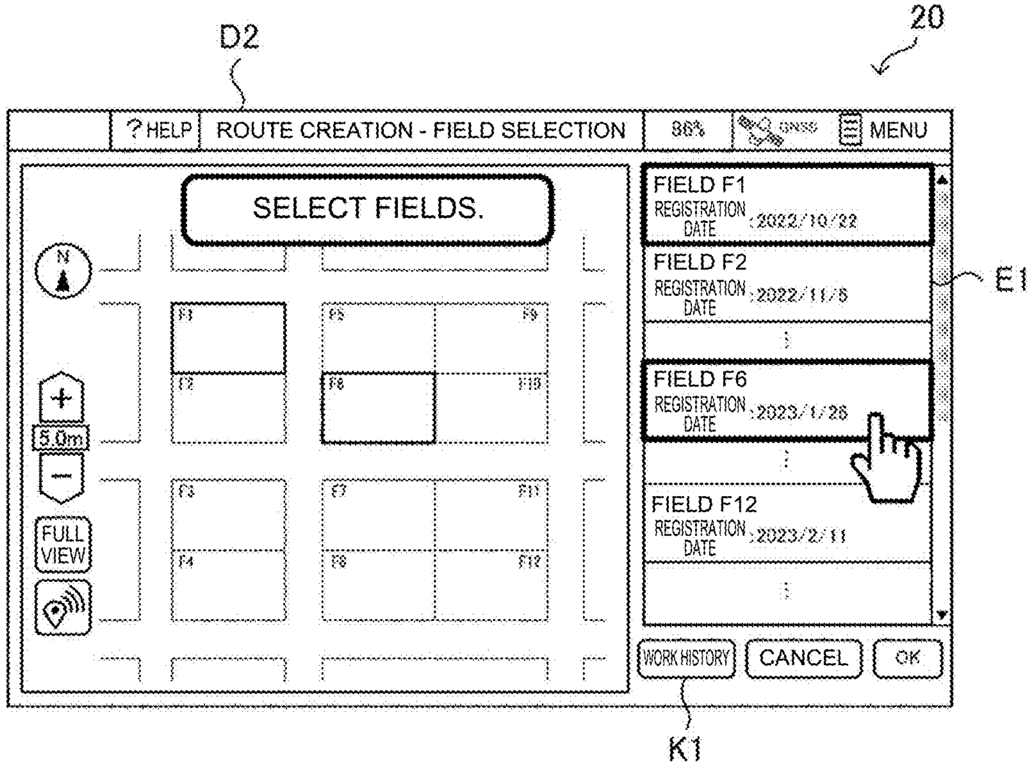
FIG. 10 is a diagram illustrating an example of the field selection screen displayed on the operation terminal according to an embodiment of the present invention.

In the process of creating a work plan described above, as another embodiment, the setting processing unit 211 may display work history information on a field selected by the worker. For example, as illustrated in FIG. 10, the setting processing unit 211 displays a work history button K1 on the field selection screen D2. When the worker presses the work history button K1, the setting processing unit 211 displays a work history screen D6 illustrated in FIG. 11, and displays work history information E5 on the work history screen D6. For example, when the worker selects the field F6 and presses the work history button K1, the setting processing unit 211 displays, on the work history screen D6, work history information E5 corresponding to the field F6. The work history information E5 includes information such as a work content, a work date, a required time, a climate (weather, air temperature, humidity, and the like) of previous work. Furthermore, the setting processing unit 211 calculates the average time of a time required (average required time) for each previous work, and displays the average required time. The average required time corresponds to the estimated work time (e.g., "80 minutes" for the field F6) included in the work plan (see FIG. 8B).

Furthermore, the setting processing unit 211 displays the average required time for each work content in the work history information E5. When the worker presses a return button K2 on the work history screen D6, the setting processing unit 211 displays again the field selection screen D2 in FIG. 9. When the worker selects a field in which work is to be performed, the worker can check previous work information.

The operation terminal 20 may be able to access, through the communication network N1, a website with an agricultural support service (agricultural support site) provided on a server (not illustrated). In such a case, the operation control unit 21 executes a browser program, allowing the operation terminal 20 to function as an operation terminal of the server. The server includes the processing units described above, and performs the processes.

[Automatic Traveling Process]

Figure 12:
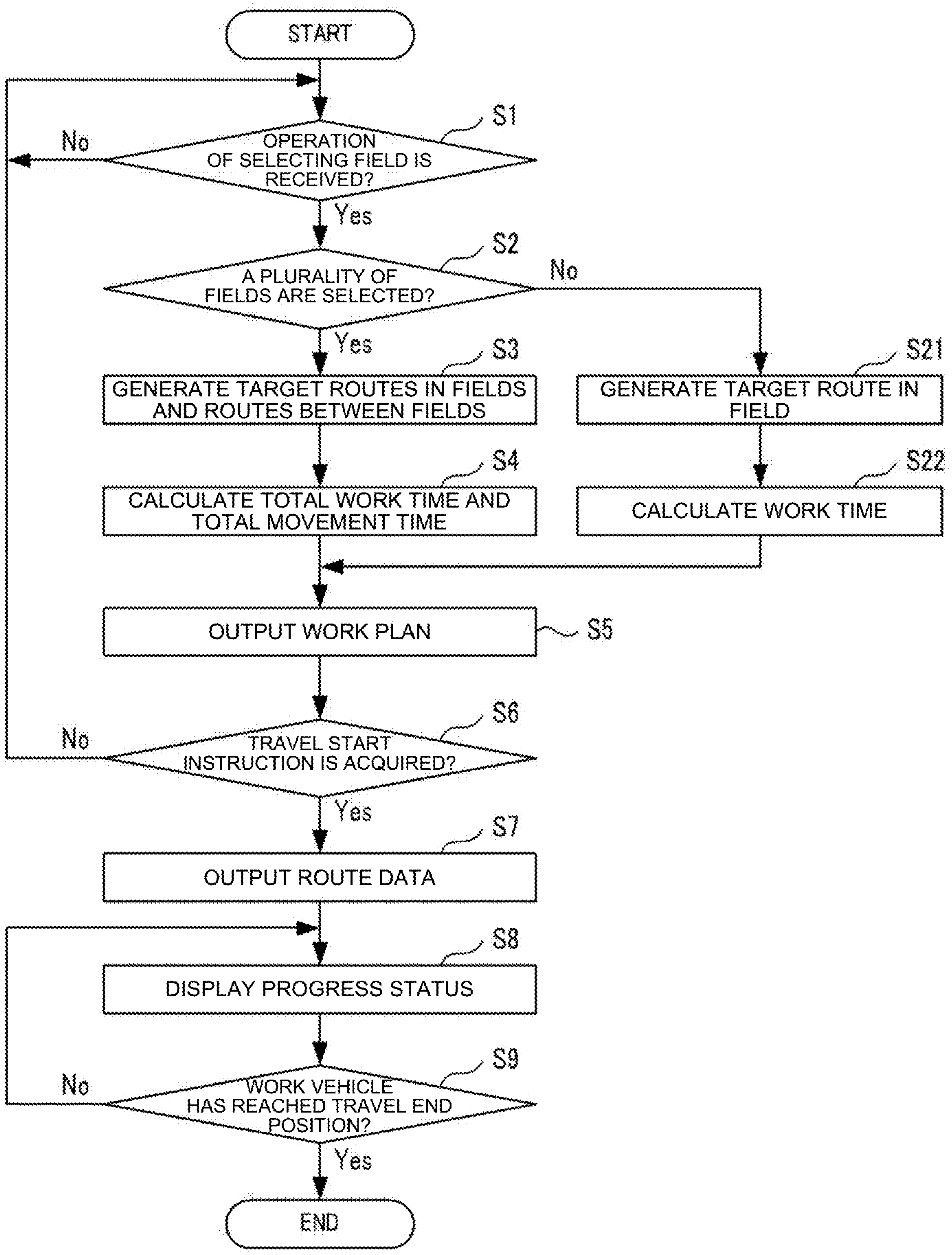
FIG. 12 is a flowchart illustrating an example of a procedure for an automatic traveling process performed by the automatic traveling system according to an embodiment of the present invention.

An example of the automatic traveling process performed by the automatic traveling system 1 will be described below with reference to FIG. 12.

The present invention may be regarded as an invention of an automatic traveling method for performing one or more steps included in the automatic traveling process. One or more steps included in the automatic traveling process described here may be omitted as appropriate. The steps in the automatic traveling process may be performed in a different order as long as the same effect is achieved. Furthermore, in the example described below, the operation control unit 21 performs the steps in the automatic traveling process; however, another embodiment may be an automatic traveling method in which one or more processors perform the steps in the automatic traveling process in a distributed manner.

The automatic traveling method includes a work management method of the present invention, and the automatic traveling program includes a work management program of the present invention.

In step S1, the operation control unit 21 of the operation terminal 20 determines whether an operation of selecting a field is received from the worker. When an operation of selecting a field is received (Yes in S1), the operation control unit 21 causes the process to proceed to step S2. The operation control unit 21 waits until an operation of selecting a field is received (No in S1).

In step S2, the operation control unit 21 determines whether a plurality of fields are selected. In the case where a plurality of fields are selected (Yes in S2), the operation control unit 21 causes the process to proceed to step S3. On the other hand, in the case where a single field is selected (No in S2), the operation control unit 21 causes the process to proceed to step S21.

In step S3, the operation control unit 21 generates target routes R1 corresponding to the respective plurality of fields, and one or more movement routes that connect the plurality of fields. For example, when on the field selection screen D2 (field list E1) illustrated in FIG. 6, the worker selects the field F1, the field F6, and the field F12 in this order and presses the OK button, the operation control unit 21 generates a target route R1 in the field F1, a target route R1 in the field F6, a target route R1 in the field F12, a movement route Ra that connects the predetermined position P1 and the field F1, a movement route Rb that connects the field F1 and the field F6, a movement route Rc that connects the field F6 and the field F12, and a movement route Rd that connects the field F12 and the predetermined position P1 (see FIG. 7).

Figure 11:
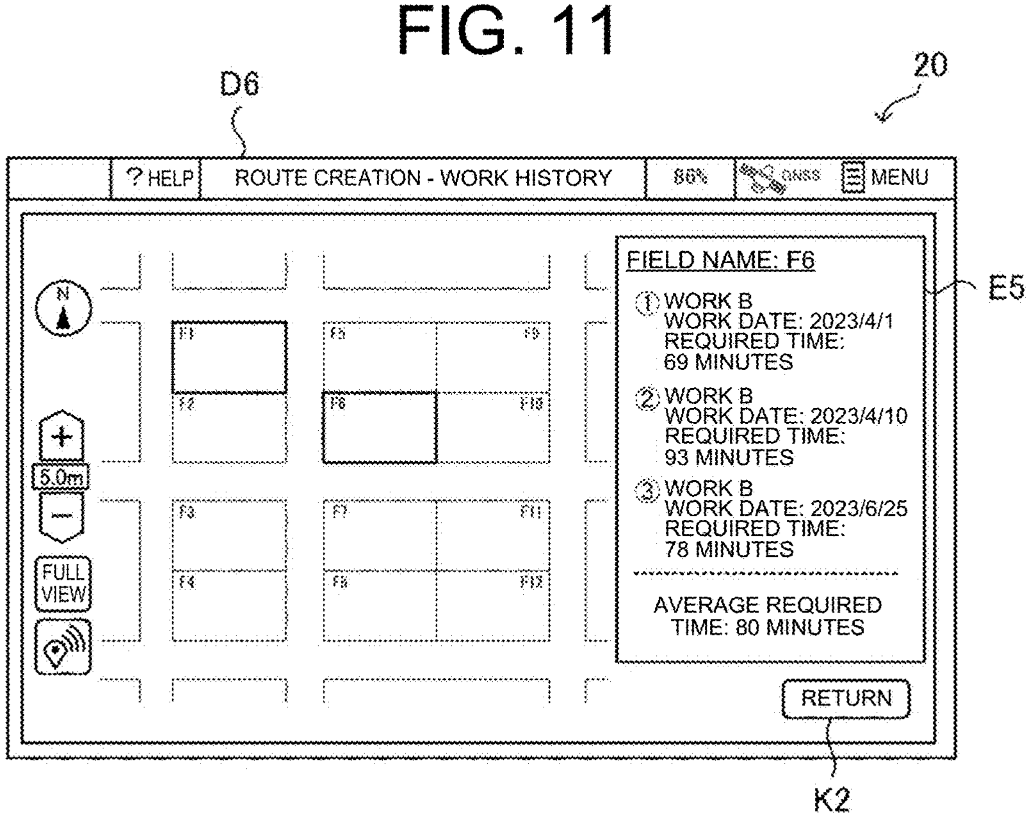
FIG. 11 is a diagram illustrating an example of a work history screen displayed on the operation terminal according to an embodiment of the present invention.

As another embodiment, when on the field selection screen D2 illustrated in FIG. 10, the worker selects a field and presses the work history button K1, the operation control unit 21 may display the work history screen D6 illustrated in FIG. 11, and display work history information E5 corresponding to the selected field. In such a case, when the worker selects a field, the worker can check a previous work performance.

Next, in step S4, the operation control unit 21 calculates a total work time (estimated total work time) that is required for the work vehicle 10 to perform work in the plurality of fields, and a total movement time (estimated total movement time) that is required for the work vehicle 10 to move along the movement routes. Specifically, the operation control unit 21 calculates, as an estimated work time for each of the plurality of fields, the average time of a plurality of previous work times in the corresponding field, and calculates the sum of the estimated work times for the respective plurality of fields to obtain a total work time (estimated total work time). For example, the operation control unit 21 calculates the sum of estimated work times for the respective fields F1, F6, and F12 to obtain a total work time ("3 hours 20 minutes").

Furthermore, the operation control unit 21 calculates, as an estimated movement time for each of the movement routes, the average time of a plurality of movement times included in a plurality of previous movement performances, and calculates the sum of the estimated movement times for the respective movement routes to obtain a total movement time (estimated total movement time). For example, the operation control unit 21 calculates the sum of estimated movement times for the respective movement routes Ra, Rb, Rc, and Rd to obtain a total movement time ("55 minutes").

Furthermore, the operation control unit 21 calculates the sum of the total work time and the total movement time to obtain a total required time (estimated required time). For example, the operation control unit 21 calculates the sum of the estimated work times for the respective fields F1, F6, and F12 and the estimated movement times for the respective movement routes Ra, Rb, Rc, and Rd to obtain a total required time ("4 hours 15 minutes"). After step S4, the operation control unit 21 causes the process to proceed to step S5.

On the other hand, when a single field is selected by the worker (No in S2), in step S21, the operation control unit 21 generates a target route R1 in the selected field. In subsequent step S22, the operation control unit 21 calculates an estimated work time for the field. After step S22, the operation control unit 21 causes the process to proceed to step S5.

Next, in step S5, the operation control unit 21 outputs a work plan. Specifically, the operation control unit 21 creates a work plan that includes information such as a time required for work, a moving distance, a work area, and a field name, and displays the work plan on the work plan screen D3. In the case where a plurality of fields are selected, for example, as illustrated in FIG. 7, the operation control unit 21 further displays, on the work plan screen D3, information such as a work order of the plurality of fields, a movement order between the fields, and an estimated work time for each of the fields. Specifically, on the map on the work plan screen D3, the operation control unit 21 displays, in association with each of the fields, information such as a field name, a work content, an estimated work time, a work order, and displays, in association with each of the movement routes, information such as an estimated movement time and a movement order.

Furthermore, the operation control unit 21 displays, in the work plan display column E2, the total required time, the total work time, the total movement time, the moving distance, the number of fields in which work is to be performed, the total work area, the name of the fields in which work is to be performed, and the like. The information displayed on the map and the information displayed in the work plan display column E2 are each an example of the work plan of the present invention. In the case where a single field is selected, the work plan includes information corresponding to the field.

When, after the work plan is output (displayed), the worker performs a registration operation (an operation of pressing the registration button in FIG. 7), the operation control unit 21 registers the work plan in the storage unit 22.

Next, in step S6, the operation control unit 21 determines whether an operation of issuing a travel start instruction is received from the worker. When an operation of issuing a travel start instruction is received from the worker (Yes in S6), the operation control unit 21 causes the process to proceed to step S7. For example, when the worker selects "work plan 4" on the work plan selection screen D4 illustrated in FIG. 8A, and presses the start button on the work plan selection screen D4 illustrated in FIG. 8B, the operation control unit 21 receives an operation of issuing a travel start instruction.

When no operation of issuing a travel start instruction is received from the worker (No in S6), the operation control unit 21 causes the process to proceed to step S1. The operation control unit 21 repeatedly performs the process of creating a work plan until an operation of issuing a travel start instruction is received from the worker.

In step S7, the operation control unit 21 outputs route data to the work vehicle 10. In this case, the operation control unit 21 outputs, to the work vehicle 10, route data on the target routes and the movement routes corresponding to "work plan 4". Specifically, the operation control unit 21 outputs, to the work vehicle 10, route data that includes the target routes R1 corresponding to the respective fields F1, F6, and F12, the movement route Ra that connects the predetermined position P1 and the field F1, the movement route Rb that connects the field F1 and the field F6, the movement route Rc that connects the field F6 and the field F12, and the movement route Rd that connects the field F12 and the predetermined position P1.

When the work vehicle 10 acquires the route data, the work vehicle 10 starts automatic travel (see FIG. 3). Specifically, the travel processing unit 111 of the work vehicle 10 causes the work vehicle 10 to automatically travel from the predetermined position P1 to the field F1 along the movement route Ra, and when the work vehicle 10 reaches the field F1, in the field F1, the travel processing unit 111 causes the work vehicle 10 to automatically travel from the work start position S to the work end position G along the target route R1. When the work vehicle 10 reaches the work end position G, the travel processing unit 111 causes the work vehicle 10 to automatically travel from the field F1 to the field F6 along the movement route Rb, and in the field F6, the travel processing unit 111 causes the work vehicle 10 to automatically travel from the work start position S to the work end position G along the target route R1. When the work vehicle 10 reaches the work end position G, the travel processing unit 111 causes the work vehicle 10 to automatically travel from the field F6 to the field F12 along the movement route Rc, and in the field F12, the travel processing unit 111 causes the work vehicle 10 to automatically travel from the work start position S to the work end position G along the target route R1. When the work vehicle 10 reaches the work end position G, the travel processing unit 111 causes the work vehicle 10 to automatically travel from the field F12 to the predetermined position P1 along the movement route Rd.

Next, in step S8, the operation control unit 21 displays a progress status on the operation terminal 20 (operation display unit 23). Specifically, when the work vehicle 10 starts automatic travel, the operation control unit 21 displays a travel status, a work progress status, and the like on the operation terminal 20. For example, when the work vehicle 10 starts automatic travel, the operation control unit 21 displays the work screen D5 illustrated in FIG. 9, and displays a travel status such as a travel path and the current position of the work vehicle 10 on the map on the work screen D5. Furthermore, the operation control unit 21 displays, in the work information E4 on the work screen D5, information such as identification information of the work plan ("work plan 4"), a name of the field in which work is currently being performed, a time (start time) at which work is started, a time (expected end time) at which work is expected to be finished, a progress rate, and an expected deviation time.

Next, in step S9, the operation control unit 21 determines whether the work vehicle 10 has reached a travel end position. In this case, the travel end position is set to the predetermined position P1 (see FIG. 3). When the work vehicle 10 has reached the travel end position (the predetermined position P1) (Yes in S9), the operation control unit 21 ends the process. The operation control unit 21 continuously performs the display process in step S8 until the work vehicle 10 reaches the travel end position (No in S9). For example, while the work vehicle 10 is automatically traveling, the operation control unit 21 updates the progress rate and the expected deviation time in real time according to the travel status and the work status of the work vehicle 10. Furthermore, in step S8, for example, when the expected deviation time exceeds a predetermined time, the operation control unit 21 may output a warning sound from the operation terminal 20 or the work vehicle 10.

In this manner, the operation control unit 21 performs the automatic traveling process (work management process). Each time work is finished, the operation control unit 21 stores work history information in the storage unit 22.

For example, the operation control unit 21 adds, to the work history information E5 (see FIG. 11), information such as a work content, a work date, and a required time for the current work, and updates the average required time. Thus, each time the work vehicle 10 performs work, work history information is accumulated and updated by the operation control unit 21.

As described above, the automatic traveling system 1 according to the present embodiment acquires work history information on work performed by the work vehicle 10 in each of a plurality of fields (work regions), and movement history information on movement performed in the work by the work vehicle 10 on one or more roads (connecting roads) that connect the plurality of fields, and outputs, based on the work history information and the movement history information, a total required time (estimated required time) that is required for the work vehicle 10 to perform work in the plurality of fields.

The above configuration enables presentation, to the worker, of not only an estimated work time for a single field but also an overall required time (estimated required time) including both an estimated work time for each of a plurality of fields and an estimated movement time for movement between the fields. This allows the worker to determine a time required for work to be performed in a plurality of fields.

Furthermore, the automatic traveling system 1 may display, on the operation terminal 20, a total work time (estimated total work time) that is required for the work vehicle 10 to perform work in the plurality of fields, and a total movement time (estimated total movement time) that is required for the work vehicle 10 to move on the roads (movement routes). In such a case, the worker can individually determine a time required to perform work in a plurality of fields and a time required to move between the fields. The total work time (estimated total work time) and the total movement time (estimated total movement time) are each an example of the estimated required time of the present invention. That is, the automatic traveling system 1 of the present invention is capable of outputting at least one of the total work time (estimated total work time) and the total movement time (estimated total movement time). For example, the automatic traveling system 1 may output one or both of the total work time (estimated total work time) and the total movement time (estimated total movement time) according to a display setting operation performed by the worker.

Other Embodiments

The present invention is not limited to the embodiment described above, and may be the following embodiments.

Figure 13:
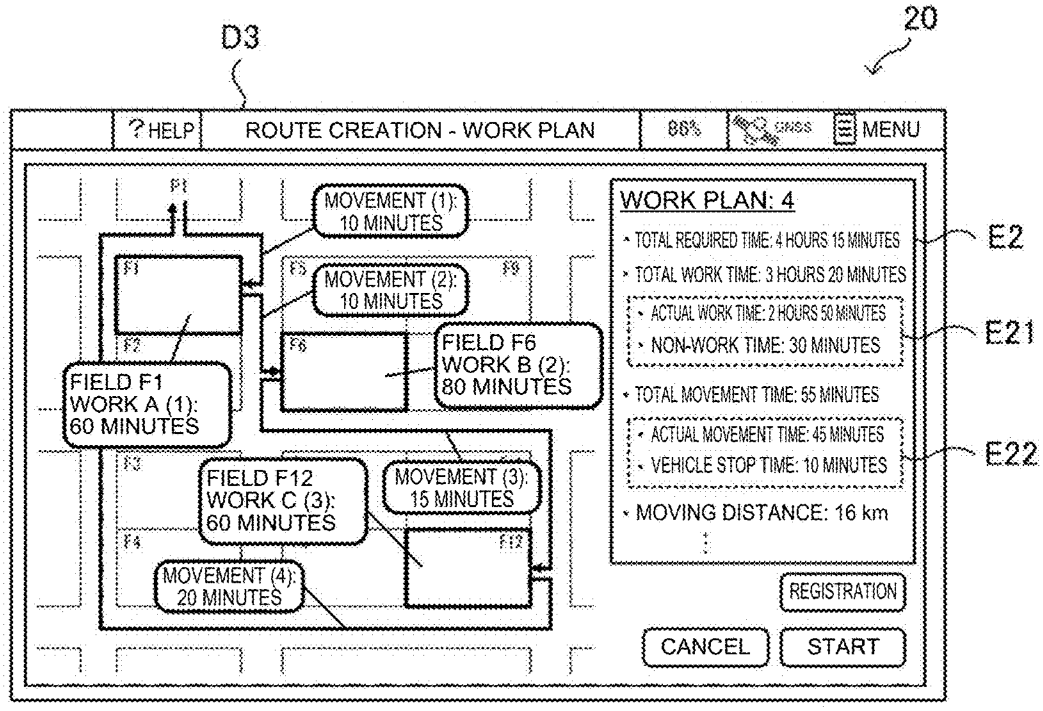
FIG. 13 is a diagram illustrating an example of the work plan screen displayed on the operation terminal according to an embodiment of the present invention.

For example, when the work vehicle 10 performs, in a field, setting work (work performed using the work machine 14) (cultivation work, mowing work, harvesting operation, spraying work, or the like) set by the worker, in some cases, the work vehicle 10 performs work other than the setting work, for example, replenishment work of material, fuel, or the like, harvest discharge work, adjustment work and replacement work of the work machine 14, or the like. Thus, the work history information includes a work time (setting work time) that is required for the work vehicle 10 to actually perform setting work, and a time (non-setting work time) that is required for work other than the setting work. Therefore, the operation control unit 21 may calculate an estimated setting work time and an estimated non-setting work time based on the work history information, and separately display the estimated setting work time and the estimated non-setting work time on the operation terminal 20. For example, as illustrated in FIG. 13, the operation control unit 21 displays detailed information E21 that includes the estimated setting work time (corresponding to "actual work time" in FIG. 13) and the estimated non-setting work time (corresponding to "non-work time" in FIG. 13).

In some cases, the worker temporarily stops automatic travel and work performed by the work vehicle 10 to take a break. That is, in some cases, the work history information includes a time (break time) required for a break in previous work. Thus, the operation control unit 21 may calculate an estimated break time based on the work history information, and display the estimated break time on the operation terminal 20. The time required for replenishment work of material, fuel, or the like, the time required for harvest discharge work, the time required for adjustment work and replacement work of the work machine 14, and the break time are examples of the non-setting work time of the present invention.

The estimated setting work time is a determined time that is certainly required for the work vehicle 10 to perform set work; however, the estimated non-setting work time and the estimated break time are a time (variable time) that may vary each time. Thus, the operation control unit 21 may receive, from the worker, an operation of selecting whether to display both the estimated setting work time and the variable time on the operation terminal 20 or to display only the estimated setting work time out of the estimated setting work time and the variable time on the operation terminal 20.

Furthermore, for example, when the work vehicle 10 travels along a movement route on a road, in some cases, the work vehicle 10 detects an obstacle and is stopped, or the work vehicle 10 is stopped so as not to interfere with travel of another work vehicle 10. Thus, the movement history information includes an actual movement time required for the work vehicle 10 to actually move and a vehicle stop time. Therefore, the operation control unit 21 may calculate an estimated actual movement time and an estimated vehicle stop time based on the movement history information, and separately display the estimated actual movement time and the estimated vehicle stop time on the operation terminal 20. For example, as illustrated in FIG. 13, the operation control unit 21 displays detailed information E22 that includes the estimated actual movement time (corresponding to "actual movement time" in FIG. 13) and the estimated vehicle stop time (corresponding to "vehicle stop time" in FIG. 13).

The estimated actual movement time is a determined time that is certainly required for the work vehicle 10 to move on a road; however, the estimated vehicle stop time is a time (variable time) that may vary each time. Thus, the operation control unit 21 may receive, from the worker, an operation of selecting whether to display both the estimated actual movement time and the vehicle stop time on the operation terminal 20 or to display only the estimated actual movement time out of the estimated actual movement time and the vehicle stop time on the operation terminal 20.

According to the above configuration, when the worker creates a work plan, the worker can determine a work time and a movement time that are actually required, other required times, and the like. As another embodiment, the operation control unit 21 may create a work plan excluding the variable time and the estimated vehicle stop time. Furthermore, the operation control unit 21 may receive, from the worker, an operation of selecting whether to create a work plan excluding the variable time and the estimated vehicle stop time or to create a work plan including the variable time and the estimated vehicle stop time.

As another embodiment of the present invention, the operation control unit 21 may be able to receive, from the worker, an operation of setting a desired required time for a work plan. For example, when the worker creates a work plan, the worker sets a desired required time that is required for the work vehicle 10 to perform work according to the work plan. For example, when work is to be performed according to "work plan 4" and an estimated total required time is "4 hours 15 minutes", the worker sets "4 hours" as a desired total required time (desired required time). When a desired required time is set by the worker, the operation control unit 21 displays the desired required time on the work screen D5 (see FIG. 14).

Furthermore, when an operation of setting a desired required time for a work plan is received from the worker and work is performed according to the work plan by the work vehicle 10, the operation control unit 21 outputs progress information that indicates a progress status with respect to the desired required time. The operation control unit 21 sets, as the expected end time, a time obtained by adding the desired required time to a start time, and calculates the progress rate and the expected deviation time based on an elapsed time from the start time and the expected end time.

Figure 14:
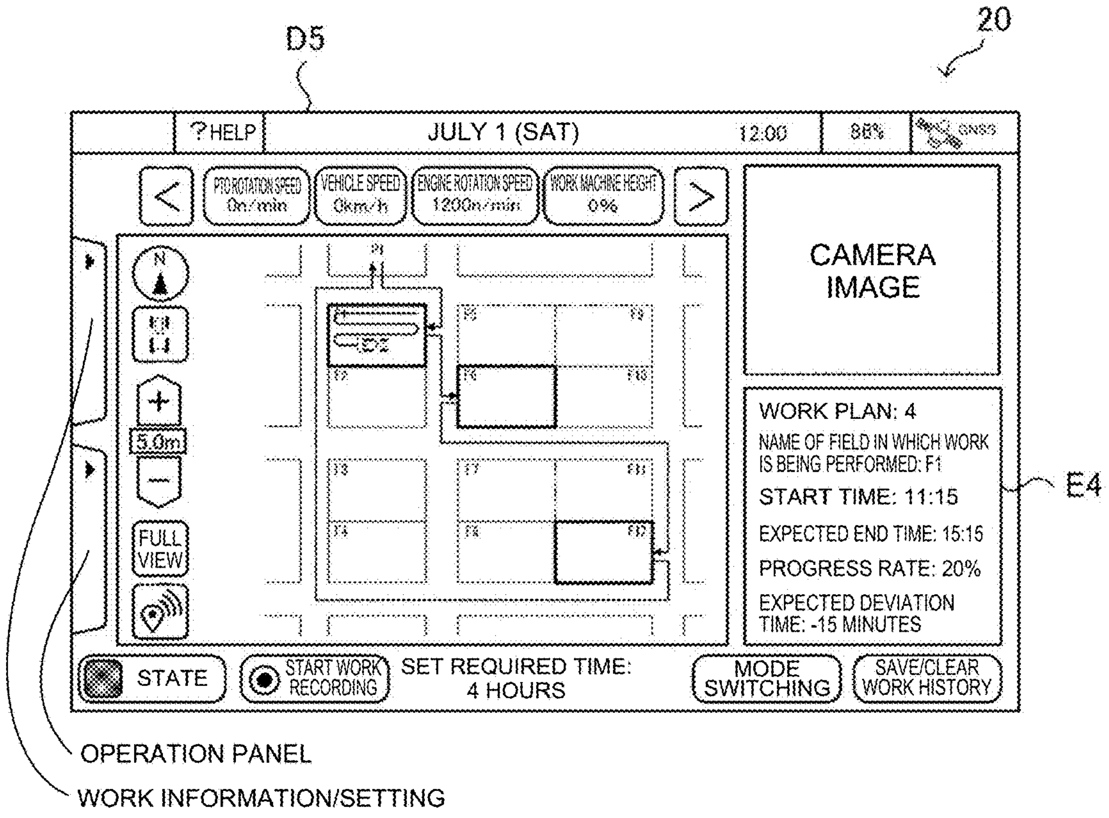
FIG. 14 is a diagram illustrating an example of the work screen displayed on the operation terminal according to an embodiment of the present invention.

For example, as illustrated in FIG. 14, the operation control unit 21 displays information on the set required time, the expected end time, the progress rate, and the expected deviation time. Thus, while the work vehicle 10 is performing work, the worker can determine in real time, on the operation terminal 20, the progress rate and the expected deviation time with respect to the time (desired required time) set by the worker.

When the expected deviation time exceeds a predetermined time, the travel processing unit 111 of the work vehicle 10 may change the travel state (vehicle speed, movement route, or the like) of the work vehicle 10. Furthermore, after the work vehicle 10 starts automatic travel, the operation control unit 21 may receive, from the worker, an operation of setting the desired required time or an operation of changing the desired required time.

The operation terminal 20 according to the present embodiment may be mounted on the work vehicle 10, or may be placed outside the work vehicle 10. Furthermore, the processing units of the operation terminal 20 may be included in the vehicle control device 11 of the work vehicle 10. That is, in the above embodiment, the operation terminal 20 corresponds to a work management system according to the present invention; however, the work management system according to the present invention may be composed of the work vehicle 10 alone. Furthermore, the work management system according to the present invention may include the work vehicle 10 and the operation terminal 20. Furthermore, the processing units of the operation terminal 20 may be included in a server capable of communicating with the work vehicle 10.

Appendices

A summary of the invention extracted from the above-described embodiments will be described below as appendices. Configurations and processing functions described in the following appendices may be selected and combined as appropriate.

<Appendix 1>

A work management method including:

acquiring work history information on work performed by a work vehicle in each of a plurality of work regions, and movement history information on movement performed in the work by the work vehicle on one or more connecting roads that connect the plurality of work regions; and outputting, based on the work history information and the movement history information, an estimated required time that is required for the work vehicle to perform work in the plurality of work regions.

<Appendix 2>

The work management method according to appendix 1, wherein an estimated total work time that is required for the work vehicle to perform work in the plurality of work regions and an estimated total movement time that is required for the work vehicle to move on the one or more connecting roads are displayed as the estimated required time on an operation terminal.

<Appendix 3>

The work management method according to appendix 1 or 2, wherein an estimated work time for each of the plurality of work regions and an estimated movement time for each of the one or more connecting roads are displayed as the estimated required time on an operation terminal.

<Appendix 4>

The work management method according to appendix 3, wherein the estimated work time includes a setting work time that is required for the work vehicle to perform setting work set for the plurality of work regions, and a non-setting work time that is required for the work vehicle to perform work different from the setting work, and the setting work time and the non-setting work time are separately displayed on the operation terminal.

<Appendix 5>

The work management method according to appendix 4, wherein an operation of selecting whether to display both the setting work time and the non-setting work time on the operation terminal or to display only the setting work time out of the setting work time and the non-setting work time on the operation terminal is received from a user.

<Appendix 6>

The work management method according to any one of appendices 3 to 5, wherein the estimated movement time includes an actual movement time that is required for the work vehicle to travel on the one or more connecting roads, and a vehicle stop time during which the work vehicle is stopped on the one or more connecting roads, and the actual movement time and the vehicle stop time are separately displayed on the operation terminal.

<Appendix 7>

The work management method according to appendix 6, wherein an operation of selecting whether to display both the actual movement time and the vehicle stop time on the operation terminal or to display only the actual movement time out of the actual movement time and the vehicle stop time on the operation terminal is received from a user.

<Appendix 8>

The work management method according to any one of appendices 3 to 7, wherein when an operation of selecting the plurality of work regions is received from a user, a work plan that includes the estimated work time for each of the plurality of work regions and the estimated movement time for each of the one or more connecting roads is created and displayed on the operation terminal.

<Appendix 9>

The work management method according to appendix 8, wherein when work is performed according to the work plan by the work vehicle, progress information that indicates a progress status with respect to the estimated required time is output.

<Appendix 10>

The work management method according to appendix 8 or 9, wherein when an operation of setting a desired required time for the work plan is received from a user and work is performed according to the work plan by the work vehicle, progress information that indicates a progress status with respect to the desired required time is output.

<Appendix 11>

The work management method according to appendix 9 or 10, wherein when a work delay time from the work plan exceeds a predetermined time, notification of predetermined information is provided.

<Appendix 12>

The work management method according to any one of appendices 9 to 11, wherein travel of the work vehicle is controlled based on the progress status.

REFERENCE SIGNS LIST

1 Automatic traveling system
10 Work vehicle
11 Vehicle control device
20 Operation terminal
21 Operation control unit
111 Travel processing unit

211 Setting processing unit
212 Acquisition processing unit
213 Output processing unit
D1 Menu screen
D2 Field selection screen
D3 Work plan screen
D4 Work plan selection screen
D5 Work screen
D6 Work history screen
F Field (work region)
P1 Predetermined position
R0 Road (connecting road)
R1 Target route
Ra Movement route
Rb Movement route
Rc Movement route
Rd Movement route

The invention claimed is:

1. A work management method comprising:
acquiring work history information on work performed by a work vehicle in each of a plurality of work regions, and movement history information on movement performed in the work by the work vehicle on one or more connecting roads that connect the plurality of work regions;
outputting, based on the work history information and the movement history information, an estimated required time that is required for the work vehicle to perform work in the plurality of work regions, wherein the estimated work time includes a setting work time that is required for the work vehicle to perform setting work set for the plurality of work regions, and a non-setting work time that is required for the work vehicle to perform work different from the setting work;
displaying, on an operation terminal, an estimated work time for each of the plurality of work regions and an estimated movement time for each of the one or more connecting roads are displayed as the estimated required time, wherein the setting work time and the non-setting work time are separately displayed on the operation terminal; and
traveling by the work vehicle on a travel route based on the estimated required time that includes the plurality of work regions and the one or more connecting roads.

2. The work management method according to claim 1, wherein
an estimated total work time that is required for the work vehicle to perform work in the plurality of work regions and an estimated total movement time that is required for the work vehicle to move on the one or more connecting roads are displayed as the estimated required time on an operation terminal.

3. The work management method according to claim 1, wherein
an operation of selecting whether to display both the setting work time and the non-setting work time on the operation terminal or to display only the setting work time out of the setting work time and the non-setting work time on the operation terminal is received from a user.

4. The work management method according to claim 1, wherein
the estimated movement time includes an actual movement time that is required for the work vehicle to travel on the one or more connecting roads, and a vehicle stop time during which the work vehicle is stopped on the one or more connecting roads, and the actual movement time and the vehicle stop time are separately displayed on the operation terminal.

5. The work management method according to claim 4, wherein
an operation of selecting whether to display both the actual movement time and the vehicle stop time on the operation terminal or to display only the actual movement time out of the actual movement time and the vehicle stop time on the operation terminal is received from a user.

6. The work management method according to claim 1, wherein
when an operation of selecting the plurality of work regions is received from a user, a work plan that includes the estimated work time for each of the plurality of work regions and the estimated movement time for each of the one or more connecting roads is created and displayed on the operation terminal.

7. The work management method according to claim 6, wherein
when work is performed according to the work plan by the work vehicle, progress information that indicates a progress status with respect to the estimated required time is output.

8. The work management method according to claim 7, wherein
when a work delay time from the work plan exceeds a predetermined time, notification of predetermined information is provided.

9. The work management method according to claim 7, wherein
travel of the work vehicle is controlled based on the progress status.

10. The work management method according to claim 6, wherein
when an operation of setting a desired required time for the work plan is received from a user and work is performed according to the work plan by the work vehicle, progress information that indicates a progress status with respect to the desired required time is output.

11. A non-transitory medium comprising instructions to configure one or more processors:
to acquire work history information on work performed by a work vehicle in each of a plurality of work regions, and movement history information on movement performed by the work vehicle on one or more connecting roads that connect the plurality of work regions,
to output, based on the work history information and the movement history information, an estimated required time that is required for the work vehicle to perform work in the plurality of work regions, wherein the estimated work time includes a setting work time that is required for the work vehicle to perform setting work set for the plurality of work regions, and a non-setting work time that is required for the work vehicle to perform work different from the setting work;
to display, on an operation terminal, an estimated work time for each of the plurality of work regions and an estimated movement time for each of the one or more connecting roads are displayed as the estimated required time, wherein the setting work time and the non-setting work time are separately displayed on the operation terminal; and to cause traveling by the work vehicle on a travel route based on the estimated required time that includes the plurality of work regions and the one or more connecting roads.

* * * * *